(12) United States Patent
Roth et al.

(10) Patent No.: US 10,728,031 B2
(45) Date of Patent: *Jul. 28, 2020

(54) DURABLE CRYPTOGRAPHIC KEYS

(71) Applicant: Amazon Technologies, Inc., Seattle, WA (US)

(72) Inventors: Gregory Branchek Roth, Seattle, WA (US); Gregory Alan Rubin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/167,377

(22) Filed: Oct. 22, 2018

(65) Prior Publication Data

US 2019/0058587 A1 Feb. 21, 2019

Related U.S. Application Data

(63) Continuation of application No. 14/475,468, filed on Sep. 2, 2014, now Pat. No. 10,110,382.

(51) Int. Cl.
*H04L 9/08* (2006.01)
*G06F 12/14* (2006.01)

(52) U.S. Cl.
CPC ............ *H04L 9/0894* (2013.01); *H04L 9/088* (2013.01); *H04L 9/0822* (2013.01); *H04L 9/0825* (2013.01); *G06F 12/1408* (2013.01); *G06F 2212/1052* (2013.01)

(58) Field of Classification Search
CPC ............... G06F 21/602; G06F 21/6209; G06F 12/1408; G06F 2212/1052; G06Q 20/3674; H04L 9/0894; H04L 63/06; H04L 9/08

See application file for complete search history.

(56) References Cited

U.S. PATENT DOCUMENTS

| | | | |
|---|---|---|---|
| 5,940,507 A | | 8/1999 | Cane et al. |
| 6,134,660 A | * | 10/2000 | Boneh ................. G06F 21/6209 380/201 |
| 7,739,381 B2 | | 6/2010 | Ignatius et al. |
| 7,748,045 B2 | | 6/2010 | Kenrich et al. |
| 7,836,313 B2 | | 11/2010 | Ellard |
| 8,724,815 B1 | | 5/2014 | Roth et al. |
| 9,071,429 B1 | | 6/2015 | Roth et al. |
| 9,231,923 B1 | | 1/2016 | Cignetti et al. |

(Continued)

OTHER PUBLICATIONS

J. Li et. al, Managing Data Retention Policies at Scale, IEEE (Year: 2012).*

(Continued)

*Primary Examiner* — Shanto Abedin
(74) *Attorney, Agent, or Firm* — Davis Wright Tremaine LLP

(57) ABSTRACT

Cryptographic keys are durably stored for an amount of time. A cryptographic key is encrypted so as to be decryptable using another cryptographic key that has a limited lifetime. The other cryptographic key can be used to decrypt the encrypted cryptographic key to restore the cryptographic key during the lifetime of the other cryptographic key. After the lifetime of the other cryptographic key, if a copy of the cryptographic key is lost (e.g., inadvertently and unrecoverably deleted from memory), the cryptographic key becomes irrecoverable.

20 Claims, 13 Drawing Sheets

(56) References Cited

U.S. PATENT DOCUMENTS

| | | |
|---|---|---|
| 9,251,097 B1 | 2/2016 | Kumar et al. |
| 2004/0236958 A1 | 11/2004 | Teicher et al. |
| 2005/0223242 A1 | 10/2005 | Nath |
| 2005/0223414 A1* | 10/2005 | Kenrich ............ G06Q 20/3674 726/27 |
| 2005/0278787 A1 | 12/2005 | Naslund et al. |
| 2006/0291664 A1 | 12/2006 | Suarez et al. |
| 2007/0226809 A1 | 9/2007 | Ellard |
| 2008/0022061 A1 | 1/2008 | Ito et al. |
| 2008/0107271 A1 | 5/2008 | Mergen |
| 2008/0192940 A1 | 8/2008 | Feng et al. |
| 2008/0222430 A1 | 9/2008 | Buscaglia et al. |
| 2011/0055559 A1* | 3/2011 | Li ...................... G06F 21/6218 713/165 |
| 2012/0084263 A1 | 4/2012 | Gosnell |
| 2012/0093318 A1 | 4/2012 | Obukhov et al. |
| 2013/0223622 A1 | 8/2013 | Sowa et al. |
| 2015/0019858 A1 | 1/2015 | Roth et al. |
| 2015/0089244 A1 | 3/2015 | Roth et al. |

OTHER PUBLICATIONS

Burrows et al., "Security Requirements for Cryptographic Modules," U.S. Department of Commerce National Institute of Standards and Technology (NIST) Federal Information Processing Standards (FIPS) Publication 140-1, Jan. 11, 1994, 56 pages.

Li et al., "Managing Data Retention Policies at Scale," 12th IFIP/IEEE International Symposium on Integrated Network Management, May 23-27, 2011, 8 pages.

Mehuron et al., "Security Requirements for Cryptographic Modules," U.S. Department of Commerce National Institute of Standards and Technology (NIST) Federal Information Processing Standards (FIPS) Publication 140-2, May 25, 2001, 69 pages.

* cited by examiner

DURABLE CRYPTOGRAPHIC KEYS

CROSS-REFERENCE TO RELATED APPLICATIONS

This application is a continuation of U.S. application Ser. No. 14/475,468, filed on Sep. 2, 2014, the disclosure of which is incorporated herein by reference in its entirety. This application further incorporates by reference for all purposes the full disclosure of U.S. patent application Ser. No. 14/475,457, filed on Sep. 2, 2014, now U.S. Pat. No. 10,003,584, entitled "DURABLE KEY MANAGEMENT."

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

Encryption, for example, is used extensively for the purpose of preventing unauthorized access to data. Generally, a cryptographic key is used to reversibly transform data to a state where information is both computationally and humanly unascertainable without access to the cryptographic key or without extraordinary measures (e.g., a cryptographic attack). The storage of cryptographic keys used for encryption can present competing goals. For example, durable storage of a cryptographic key is generally desired so that, if a computer system malfunctions or otherwise loses access to the cryptographic key, the cryptographic key can be recovered and data encrypted under the cryptographic key is recoverable. On the other hand, in some circumstances, it is desirable to be able to destroy a cryptographic key so that the cryptographic key cannot be used to access data encrypted under the cryptographic key. Destruction of a cryptographic key, however, can be difficult. Conventional delete operations may, for example, leave a copy of the cryptographic key in a computer system's memory, at least for some amount of time, thereby leaving the cryptographic key accessible with access to the contents of the memory. Generally, the more durably a cryptographic key is stored, the more difficult destroying the key becomes.

BRIEF DESCRIPTION OF THE DRAWINGS

Various embodiments in accordance with the present disclosure will be described with reference to the drawings, in which.

DETAILED DESCRIPTION

Figure 1:
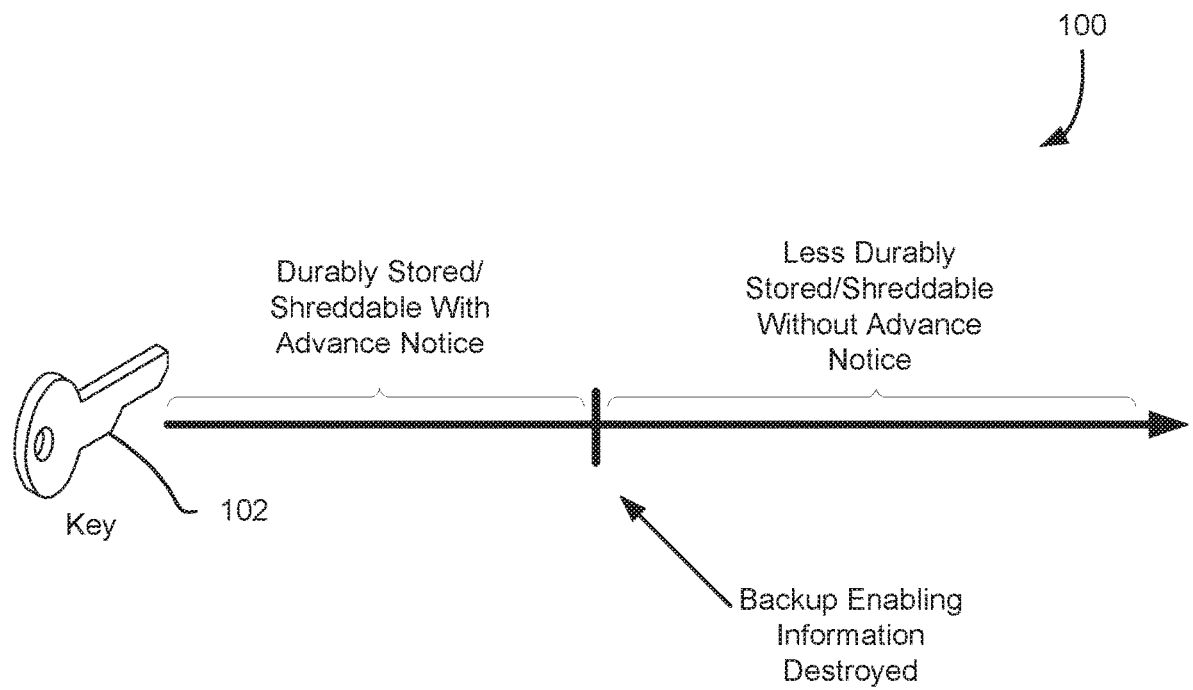
FIG. 1 shows an illustrative example of a timeline of a cryptographic key in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein provide for shreddable (destroyable) cryptographic keys that are durably stored for an amount of time. In an embodiment, a service provider provides an application programming interface (API) callable by customers of the service provider to utilize services of the service provider. In some examples, a customer of the service provider can submit an API call to the API for the purpose of backing up a cryptographic key. The cryptographic key (referred to as a "shreddable" cryptographic key to distinguish from other cryptographic keys) may be one provided by the customer (e.g., in the API call) or one managed by the service provider on behalf of the customer (e.g., to perform cryptographic operations) for the customer. The service provider may fulfill the API call of the customer by generating a backup of the cryptographic key and durably storing the backup.

In various embodiments, the service provider performs backup operations for cryptographic keys in ways that provide numerous technical advantages. In some examples, the service provider generates another cryptographic key (referred to as a "durable-until" key) that is used to encrypt the shreddable key so that the encrypted shreddable key may be stored as a backup that, if necessary, can be decrypted to restore the shreddable key. The durable-until key may be stored for an amount of time so as to be available for restoration of the shreddable key. In some embodiments, the durable-until key is stored under high security to prevent unauthorized access to the durable-until key and, potentially, access to the shreddable key. For example, the durable-until key may be generated and stored within a hardware security module or other computer system that does not allow for the programmatic exportation of the durable-until key in plaintext form and for which physical access to the memory of the computer system to access the durable-until key is impossible or extremely difficult. In such embodiments, the computer system may perform the encryption of the shreddable key so that the durable-until key is not exposed outside of the computer system (except to possibly other security modules or other computer systems that redundantly store the durable-until key). In this manner, the shreddable key is encrypted in a manner that prevents unauthorized access to the cryptographic key used for the encryption.

The encrypted shreddable key may be stored durably for an amount of time so as to be available for restoration of the shreddable key. For example, the encrypted shreddable key may be stored in a manner that is unlikely to result in loss of the encrypted shreddable key. For example, the encrypted shreddable key may be stored on a non-overwritable data storage medium or in a data storage system that is configured to durably (e.g., redundantly) store data so that the probability of data loss is within a threshold specified as acceptable. In this manner, for an amount of time, the encrypted shreddable key is available for restoration, if needed.

Additional technical advantages are achieved, in some embodiments, by creating a backup of the durable-until key so that, if needed, the durable-until key can be restored and used to restore the shreddable key. In an embodiment, the service provider uses a public key of a public/private key pair of an asymmetric cryptographic algorithm to encrypt the shreddable key. The private key of the public/private key pair (referred to as a backup key) may be stored under high security conditions. For example, the private key may be stored in a physical safe of the service provider that only select individuals can open. In this manner, the shreddable key is encrypted in a manner such that decryption of the shreddable key requires at least access to the private key stored under high security conditions.

The service provider may operate in various ways to provide for high-durability while maintaining shreddability. For example, in some embodiments, the service provider maintains backup keys only for a limited time. A single backup key may have a corresponding expiration after which the backup key is destroyed, thereby rendering the durable-until key unrecoverable using the backup key. As an example, a person with authority to open a safe in which backup keys are stored, may, on a schedule, destroy backup keys that have expired (e.g., by physically destroying the data storage media on which the backup keys are stored). In this manner, use of the backup key to restore a durable-until key (to restore a shreddable key) becomes impossible. As a result, the customer of the service provider can be assured that destruction of the durable-until key (which may occur before or after the backup key is destroyed) is sufficient to render a shreddable key unrecoverable.

Accordingly, the API of the service provider may provide for the submission of API calls to destroy durable-until keys. Fulfillment of such an API call may be, in part, fulfilled by transmitting an instruction to all computer systems with an available copy of the durable-until key to delete the available copy. Deletion may include the immediate or eventual loss of availability of the durable-until key, such as by immediately or eventually overwriting one or more memory locations with different data. In this manner, a customer knows that, if the backup key has expired, deletion of the durable-until key results in shredding of the shreddable key. At the same time, an accidental API call to delete the durable-until key or a computer malfunction that results in a loss of access to the durable-until key does not shred the shreddable key while the backup key is still available. Thus, if the durable-until key is inadvertently lost, there is still a window of opportunity to restore the shreddable key while the backup key is unexpired.

FIG. 1 shows a diagram 100 illustrating various aspects of the present disclosure and, in particular, stages that a cryptographic key 102 may go through during its life cycle. As illustrated in FIG. 1, the cryptographic key 102 may have a first stage where the cryptographic key 102 is durably stored and where the cryptographic key is shreddable with advance notice. It should be noted that the adjective "first" is used to distinguish the first stage from other stages and that the first stage not be a stage that precedes all other stages. Durable storage of data refers to an ability to recover the data in light of various events that may occur, such as a system malfunction. Durability may be achieved in various ways, such as by redundantly storing copies of the data in different storage devices, in different geographic locations, and the like. Durability may also be achieved using redundancy encoding techniques, such as erasure coding. Shreddability of data refers to the ability to render data unrestorable absent extraordinary effort. For example, for a cryptographic key, shreddability refers to the ability to remove the cryptographic key from any storage media in which the cryptographic key is stored such that any recovery of the cryptographic key requires extraordinary effort, such as extraordinary computational effort performing cryptanalysis to determine the key (e.g., by trying different possible cryptographic keys until one is found that is able to decrypt a ciphertext with the cryptographic key). Removal of data from storage media may be performed in various ways, such as by overwriting memory locations of a computer-readable storage media and/or physically destroying storage media using mechanical and/or chemical mechanisms. Other terms, such as "destructability" and other terms with the root "destruct" or "destroy" may be used synonymously with words rooted with "shred" (e.g., shreddability).

In the first stage of the cryptographic key 102, the cryptographic key 102 is durably stored such that, if the shreddable key is lost due to a system or other failure, the cryptographic key is recoverable using information stored. Further, the cryptographic key is shreddable, but only with advance notice. For example, as discussed in more detail below, the manner in which the cryptographic key is durably stored may affect the shreddability of the cryptographic key 102. As an illustrative example, discussed in more detail below, information necessary to restore the cryptographic key 102 after certain failure events may be stored in a physically secure location (e.g., a safe in a locked room in a non-public facility). The information necessary to restore the cryptographic key 102 may be destroyable only after some time in the future. For instance, various instances of information (e.g., backup keys) may be destroyed according to a schedule from which deviations are not authorized. As a result, a request to shred the cryptographic key 102 may be submitted, but not fulfilled until the information necessary to restore the cryptographic key is destroyed.

At some point, as illustrated in FIG. 1, the cryptographic key 102 transitions to a second stage where the cryptographic key is less durably stored (relative to the first stage) and is shreddable without advance notice. In this stage, the cryptographic key 102 may be somewhat durably stored (e.g., redundant copies may be stored by a plurality of HSMs or other computer systems), but less durably than in the first stage. For example, there may be some events (e.g., computer system failures) that, if they were to occur during the second stage, would result in a total loss of an ability to recover the cryptographic key but that, if they were to occur during the first stage, would not result in a total loss of an ability to recover the cryptographic key. However, during the second stage, the cryptographic key 102 may be shreddable without advance notice. For example, a request to shred the cryptographic key 102 may be fulfilled immediately (e.g., synchronously with the request such that a response to the request is able to confirm fulfillment of the request). Immediate shreddability may be achieved, for example, by destroying information necessary for restoring the cryptographic key for at least some failures such that the number of operations necessary to shred the key is fewer and/or shredding the cryptographic key is able to be performed more quickly.

It should be noted that, while cryptographic keys as the target of backups (i.e., as the data being backed up) are used throughout for the purpose of illustration, the techniques described herein are extendible to other types of data and, generally, any data that an organization may desire to store durably yet shreddably. Accordingly, while the embodiments described herein may use cryptographic keys extensively for the purpose of illustration, it should be understood that other data may replace a shreddable cryptographic key.

Figure 2:
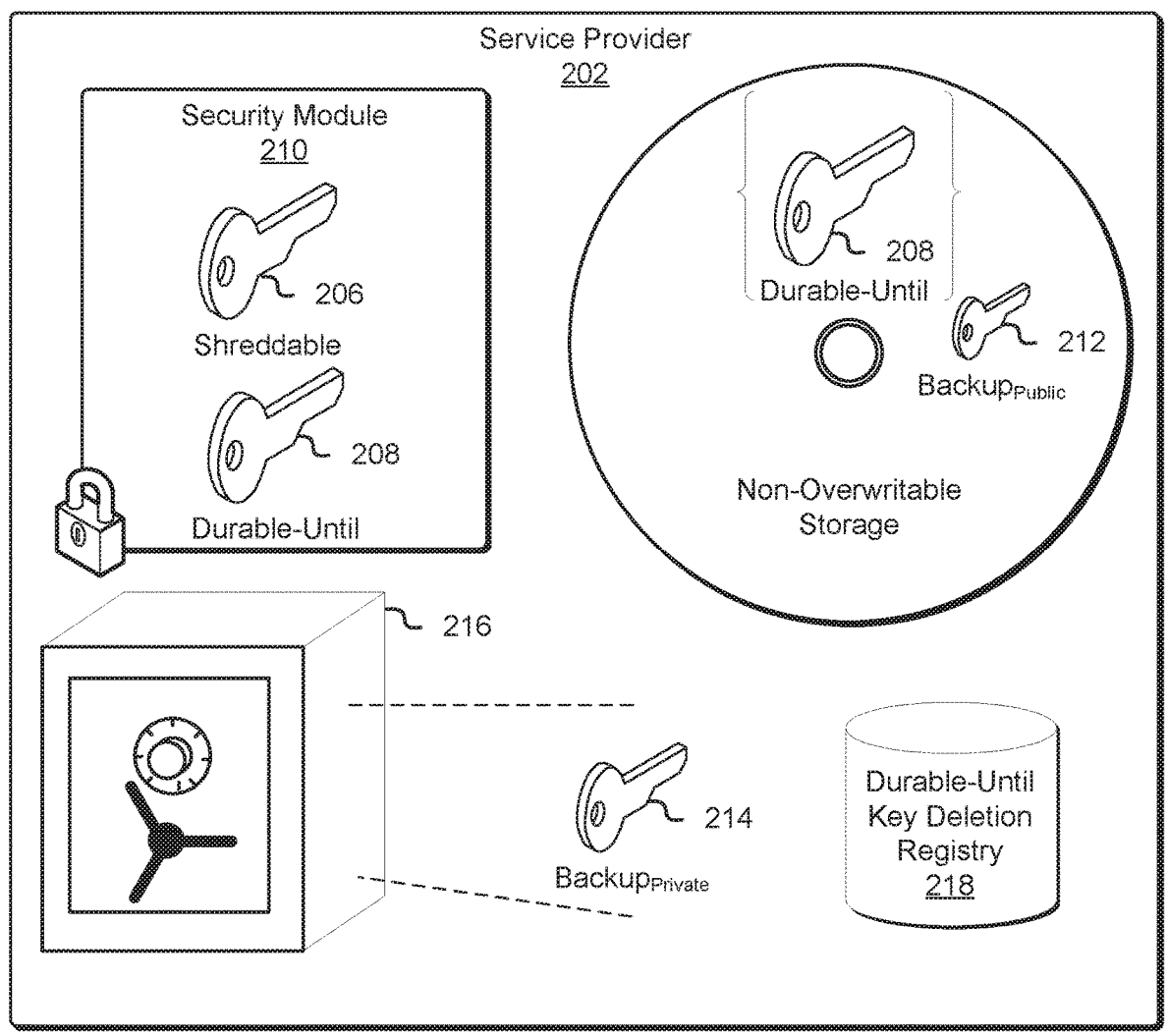
FIG. 2 shows an illustrative example of an environment in which various embodiments may be practiced.

FIG. 2 shows an illustrative example of an environment 200 which may be used to achieve various technical advantages discussed above. In the environment 200, a service provider 202 has a plurality of customers 204 (only one of which is illustrated in the figure). The customer 204 may communicate with one or more servers of the service provider 202 through an associated client computing device, such as described below. It should be noted that operations being performed by the customer and/or service provider, unless otherwise clear from context, are performed by respective computing devices (e.g., clients or servers) of the entities. The service provider 202 may provide one or more services, such as a cryptography service, discussed below. The cryptography service may be one of many computing resource services (e.g., Infrastructure as a Service (IaaS) services and/or Platform as a Service (PaaS) services) operated by the service provider 202. Further, while a customer/provider relationship is discussed throughout the present disclosure for the purpose of illustration, the techniques described herein are adaptable to other contexts, such as when the customer is an internal customer of the service provider 202 (e.g., another service of the service provider 202).

As illustrated in FIG. 2, a customer 204 of the service provider 202 has (e.g., in data storage) a shreddable key 206 that is encrypted under a durable-until key 208. It should be noted that FIG. 2 and other places uses notation whereby information inside of brackets is encrypted under a cryptographic key indicated to the lower right of the right bracket. Data is said to be encrypted under a cryptographic key if the data is decryptable using the cryptographic key. The cryptographic key may be, for example, a private cryptographic key corresponding to a public cryptographic key used to encrypt the data. (In this case, it may also be said without confusion that the data is encrypted under the public cryptographic key.) As another example, the data may be encrypted with a symmetric cryptographic key and, therefore, decryptable using the symmetric cryptographic key. Generally, it may be said that cryptographic material (e.g., a cryptographic key) is used to perform a cryptographic operation (e.g., encryption or decryption) if the key itself is input into a cryptographic primitive or the key is used to derive other information that is input into the cryptographic primitive. The durable-until key, in some embodiments, is a symmetric cryptographic key while, in other embodiments, is a private asymmetric key (i.e., a private key of a public-private key pair). The customer 204 may be provided the shreddable key 206 encrypted under the durable-until key by the service provider 202 which performed or had performed the encryption.

The durable-until key 208 is referred to as such because the durable-until key, for a first amount of time, is stored more durably than it is stored after the first amount of time. In some embodiments, the durable-until key 208 is guaranteed by the service provider 202 to be stored at a first level of durability for a specified amount of time (e.g., until a specified date). After passage of the specified amount of time, the durable-until key 208 may be stored at a lower level of durability (if at all, depending on what the customer 204 has instructed the service provider 202 to do while the durable-until key 208 was stored at the first level of durability).

The service provider 202 may store the durable-until key 208 in a security module 210, which may be an HSM or other security module, such as described below. While a single security module 210 is illustrated in FIG. 2, the service provider may utilize a fleet of security modules and the durable-until key 208 may be redundantly stored in multiple security modules. In some embodiments, the durable-until 210 key is programmatically inaccessible from the computer system(s) in which it is stored. Data may be considered programmatically inaccessible if there is not electronic communication (or collection of communications) or user input that can cause a computer system storing the data to make the data accessible in plaintext form, such as by providing the data in plaintext form or otherwise (e.g., providing the data in an encrypted form that is decryptable by the entity causing the data to be provided). Thus, in some embodiments, a security module that obtains (e.g., by generating or receiving from another security module) the durable-until key is configured such that no communication can cause the security module to provide the durable-until key in plaintext form.

To increase the durability at which the durable-until key 208 is stored, the service provider 202 may generate a backup of the durable until key 208. To do this, in some embodiments, the security module 210 (e.g., in response to an electronic transmission to the security module 210) encrypts the durable-until key 208 and provides the encrypted durable until key 208. As illustrated in FIG. 2, the security module 210 may encrypt the durable-until key 208 using a public backup key 212, which may be a public cryptographic key of a public/private key pair. The security module 210 may provide only the encrypted durable-until key 208. The security module 210 may be configured with policy that only allows the exportation of encrypted durable-until keys when encrypted with certain cryptographic keys (backup keys). Policy provided to the security modules may be authenticated (e.g., digitally signed) by a quorum of operators, where the security module is configured with a set of quorum rules that define a quorum. The encrypted shreddable key may be stored on a non-overwritable data storage medium, such as a non-rewritable compact disk or digital video disk, a memory card with mechanical component that, when in a particular state, prevents properly configured hardware from writing to the memory card. Other options include append-only storage and write-once-read-many (WORM) storage devices. The non-overwritable storage may also be data storage of a data storage system that is configured to store data with high durability (e.g., by redundantly storing data). In some examples, the non-overwritable storage is provided by a data storage service of the service provider 202. A non-overwritable data storage medium may, generally, be a storage medium configured such that, a device (e.g., drive) configured to write to the storage medium at a set of data storage locations is unable to re-write over data storage medium at the set of data storage locations.

The public backup key 212 may correspond to a private backup key 214 that is usable to decrypt the durable-until key 208. As illustrated in FIG. 2, the private backup key 214 may be stored in a physically secured environment, such as a safe 216, which may be in a locked room of a publicly-inaccessible facility of the service provider 202. Only certain individuals may have access to the interior of the safe 216. Further, in some embodiments, additional techniques may be employed. For example, the private backup key 214 may be broken into components that are stored across multiple safes, each accessible to a different set of people such that access to the private backup key 214 requires multiple authorized entities. Other security measures may also be employed. The backup key 214 may be stored programmatically inaccessibly too. Programmatic inaccessibility for the backup key 214 (or, generally, data) may be achieved, at least in part and in some embodiments, by storing the data off line such that a device used to store the data (which may or may not be a computing device) is disconnected from any network or behind one or more protective systems (e.g., a firewall). In some examples, the data may be stored in an offline repository which includes, but is not limited to, a computer system or data storage device that is: disconnected from any network, disconnected from a public network, a in a powered-off state or other state in which the device is unable to receive communications, or others. In other examples, the data is stored may be stored on a computer-readable or other storage medium that is maintained so as to be unreadable by a device and/or human. For example, the data may be stored on a computer-readable storage medium in a manner such that any device generally operable to read the computer-readable storage medium is unable to read the computer-readable storage medium (e.g., because the computer-readable storage medium needs to be inserted into a device to be read).

The service provider may maintain a schedule of deletion of private backup keys 214 stored in the safe 216, which may also schedule the addition of new private backup keys. As an example, on the first of a month, an authorized person of the service provider 202 may place into the safe 202 a set of new private backup keys. After the new private backup keys are placed into the safe (on the same day or on another day), the authorized person may select from the safe 216 expired private backup keys and physically destroy the storage media on which the expired private backup keys are stored. In this manner, expired keys are physically destroyed while new keys are introduced into the safe 216. Generally, the storage media on which the expired cryptographic keys are stored may be caused to be destroyed in various ways in accordance with various embodiments. For example, a task to destroy the media may be added to an authorized person's electronic list of tasks, a robot or other device may be scheduled to destroy the media at a scheduled time, a human or robot may be notified when it is time to destroy the media or otherwise.

As illustrated in FIG. 2, the computing resource service provider 202 may also include a durable-until deletion registry. As noted above, customers 204 may submit requests to the service provider 202 to delete a durable-until key 208. Depending on whether the corresponding private backup key 214 has been destroyed at the time a request is received, a shreddable key 206 may be restorable using a private backup key 214. The service provider 202 may include a durable-until key deletion registry 218, which may be a database that indicates whether customers have requested deletion of durable-until keys. For example, a customer may lose access to their backup or have had the backup compromised. To prevent unauthorized access/use of the shreddable key 206, the customer may submit a request (e.g., a web service API request) to delete the durable-until key. The service provider 202 may fulfill the request by causing one or more security modules 210 to delete the durable-until key from their memory and update the durable-until key deletion registry to indicate that the durable-until key has been deleted. In this manner, if an authorized entity submits a request to restore the shreddable key, the service provider can reference the durable-until key deletion registry and, if the durable-until key has been indicated as deleted, deny fulfillment of the request (or require additional authentication or otherwise operate differently than if the durable-until key had not been deleted).

As discussed, numerous variations are considered as being within the scope of the present disclosure. For example, as noted, in some embodiments, a customer has access to a shreddable key in plaintext form and uses the service provider, at least in part, to provide a durable backup of the shreddable key. In other embodiments, the customer is not provided access to the plaintext shreddable key. For instance, as illustrated in FIG. 2, the security module 210 may store the shreddable key 206 in a programmatically inaccessible manner. As with durable-until keys, policy provided to the security modules may control conditions under which an encrypted shreddable key is exportable from the security module 210 to prevent, for example, unauthorized entities from obtaining an encrypted version that such entities can decrypt.

Figure 3:
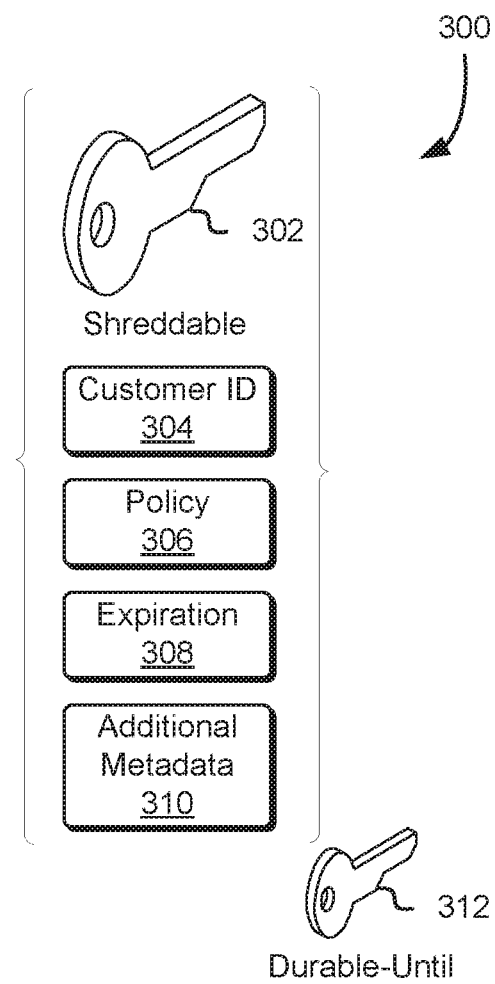
FIG. 3 shows an illustrative example of a backup object in accordance with an embodiment.

As noted, a backup of a shreddable key may be provided to a customer of a service provider. FIG. 3 shows an illustrative example of a backup object 300 which may be provided to the customer to enable restoration of a shreddable key 302. In an embodiment, the backup object 300 is a structured collection of data that includes a plurality of fields of information. The backup object may be encoded, for example, using an eXtensible Markup Language (XML) or Javascript Object Notation (JSON) format. In this example, a shreddable key field may encode the shreddable key 302. A customer ID field may encode information (such as an account identifier) that associates the backup object 300 with a particular entity (e.g., a particular customer of the service provider). A policy field 306 may encode one or more policies associated with the shreddable key 302 and/or a durable-until key 312 and/or a private backup key associate with the shreddable key 302. A policy in the policy field 306 may, for example, be a restoration policy that states a set of conditions for restoration of the shreddable key 302. The conditions may be conditions on entities (e.g., users) authorized to restore the shreddable key 302, quorum rules defining a quorum of users for authorizing restoration of the shreddable key 302, a set of Internet Protocol (IP) addresses from which a request to restore the shreddable key 302 must originate, and/or other conditions. The conditions may also state that the backup object or a request to restore the shreddable key 302 must be countersigned with a private cryptographic key corresponding to a specified public cryptographic key. In some examples, the policy specifies one or more actions that should occur should the shreddable key be submitted for restoration to the service provider. Specifiable actions may include electronic notifications sent to one or more specified network or other (e.g., email) addresses, an alarm to be sounded, a delay in fulfilling the request to provide for mitigation in case the request was submitted by an unauthorized entity and/or other actions. It should be noted that while FIG. 3 shows policy encoded in the backup object 300 some or all policies may be stored in another location, such as in a database of the service provider.

As illustrated in FIG. 3, the backup object 300 may include an expiration field which encodes an expiration for the shreddable key 302, where the expiration indicates (either expressly or implicitly) a time after which the backup object 300 is unusable to restore the shreddable key. Generally, the expiration may be any information that indicates a limit to the restorability of the shreddable key 302 using the backup object 300. Post-expiration, the backup object 300 may be unusable to restore the shreddable key 302 because a system capable of restoring the shreddable key 302 is configured to refuse requests to restore shreddable keys whose expirations have passed.

The backup object 300 may also include additional metadata 310, which may comprise one or more additional fields, such as a customer-provided description of the key, a customer-specific identifier for the key, an identifier for the shreddable key used by the service provider and/or other information. As illustrated in FIG. 3, the backup object 300, in an embodiment, is encrypted under a durable-until key 312, such as described above. As above, the durable-until key may be maintained by the service provider so as to be inaccessible to the customer to whom the backup object 300 is provided.

As with all embodiments disclosed and described explicitly there, variations are considered as being within the scope of the present disclosure. For example, backup objects may be used to back up multiple cryptographic keys. For example, a customer may submit an API call whose fulfillment causes to be provided a backup object that encrypts all cryptographic keys managed by the service provider for the customer. As another example, backup objects may comprise additional information. For example, some or all of the fields (except for the shreddable key field) may be included in the backup object in plaintext form (or, generally, in a form from which the customer can obtain the corresponding data in plaintext form, such as encrypted under a key accessible to the customer). In this manner, the customer can examine the backup object to determine, for example, the expiration and operate accordingly. Further, encryption of the fields provides for cryptographic assurances that the fields cannot be modified before presentation to the service provider for restoration. Other cryptographic mechanisms may be used in addition to or in alternative to encryption. For example, one or more of the fields (e.g., the expiration field) and/or the complete backup object 300 may be digitally signed using a cryptographic key so as to be verifiable by the service provider or a component thereof (e.g., security module). The signing key may be a symmetric cryptographic key or a private cryptographic key of a public-private key pair.

Figure 4:
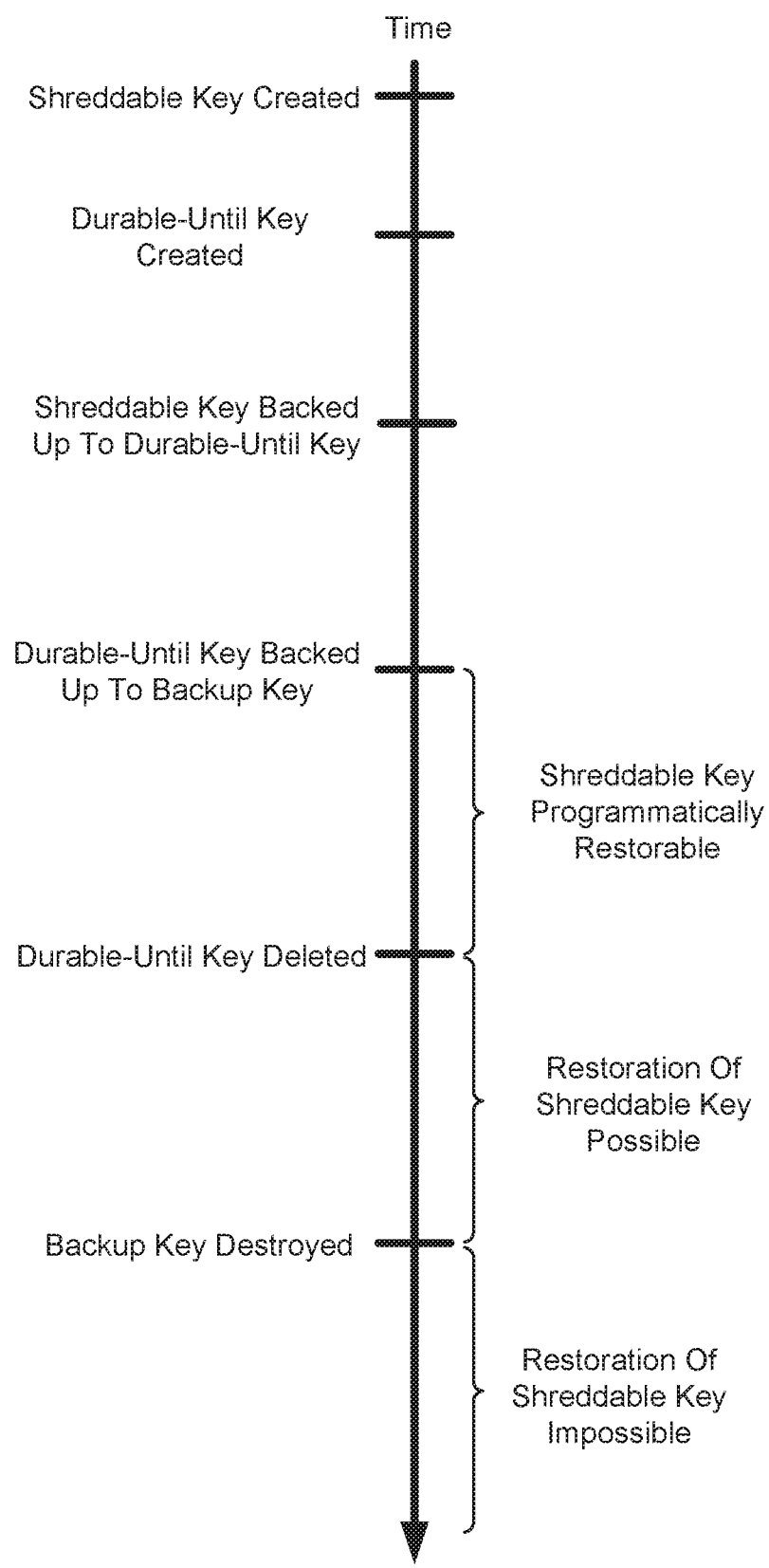
FIG. 4 shows an illustrative example of a timeline of a cryptographic key in accordance with an embodiment.

As noted, the various stages of a shreddable key may vary in accordance with the timing of various customer actions (e.g., API submissions). FIG. 4 shows an example way in which the various stages of a cryptographic key may change over time. In an embodiment, a shreddable key is created. The shreddable key may be created by the service provider (e.g., in a security module), by the customer, or otherwise.

A durable-until key may also be created by the service provider, such as in a security module from which the durable-until key is programmatically inaccessible. While FIG. 4 shows the durable-until key created after the shreddable key, the ordering of events may be reversed. Once the durable-until key is created, the shreddable key may be backed up to the durable-until key, such as by encrypting the shreddable until key in a backup object, at least a portion of which is decryptable using the durable-until key. The durable-until key may also be backed up to a backup key (e.g., encrypted under a private backup key and durably stored in encrypted form). Again, the backup of the shreddable key and the durable-until key may be performed in a different order than illustrated. At a later time, the durable-until key may be deleted, such as in response to an API call from the customer.

Between the time the durable-until key is backed up to the backup key and the durable key is deleted, the shreddable key programmatically restorable. A customer may, for example, submit a properly authenticated API call to the service provider that is configured to cause the service provider to decrypt at least a portion of a backup object to obtain the shreddable key and perform additional operations, such as by providing the shreddable key or, in other embodiments, importing the shreddable key into the system for use in performing cryptographic operations. Generally, an electronic communication can cause an automated process to restore the shreddable key.

As illustrated in FIG. 4, after the durable-until key is deleted, the backup key to which the durable-until key was backed up may be destroyed. The durable-until key may, for example, be destroyed in accordance with a schedule or, generally, at a time predetermined for the backup key. Between the time when the durable-until key is deleted and the backup key is destroyed, the shreddable key is not programmatically restorable (e.g., a communication cannot be made to cause an automated process to restore the shreddable key), but restoration of the shreddable key is nevertheless possible. For example, the backup key may be retrieved from a safe, a durably stored copy of the encrypted durable-until key may be obtained, and the backup key may be used to obtain a copy of the shreddable key. In the illustrated embodiment, after the durable-until key and the backup key are both deleted/destroyed, the shreddable key is unrecoverable (assuming the shreddable-until key was not backed up using a different mechanism). Thus, if the shreddable key is lost (e.g., deleted from computer memory permanently), it is impossible to obtain a copy of the shreddable key absent extraordinary computational effort (e.g., using cryptanalysis of ciphertexts produced using the shreddable key to calculate the shreddable key).

Figure 5:
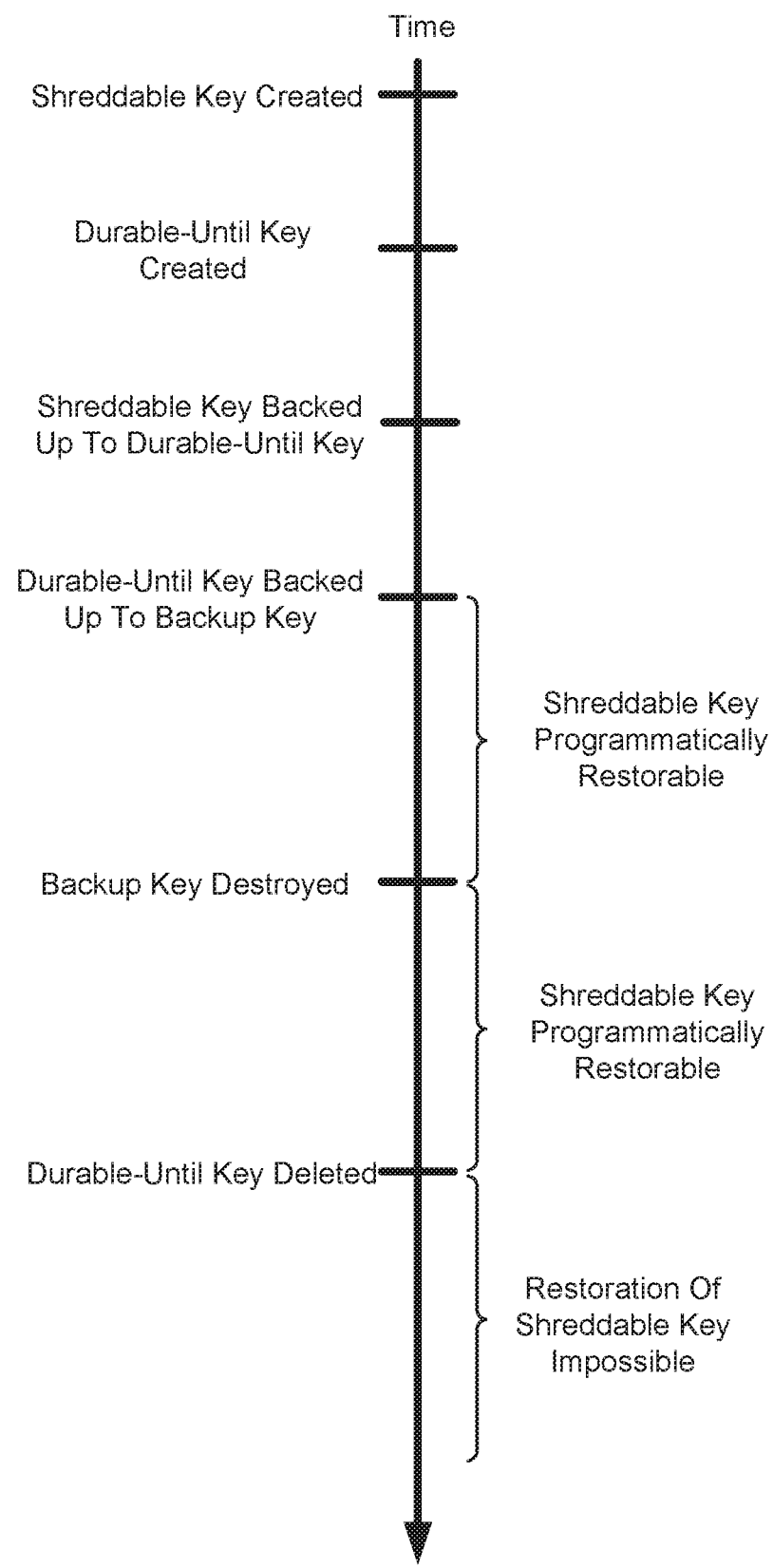
FIG. 5 shows an alternate timeline of a cryptographic key in accordance with an embodiment.

FIG. 5 shows an alternate timeline where events occur in a different order than in FIG. 4. In FIG. 5, as with FIG. 4, a shreddable key and a durable-until key are created and the shreddable key is backed up to the durable-until key. Similarly, the durable-until key is backed up to a backup key and the durable-until key (in encrypted form) is durably stored. Unlike in FIG. 4, however, in FIG. 5, the backup key is destroyed before the durable-until key is deleted. Between the time when the backup key is destroyed and the durable-until key is deleted, restoration of the shreddable key is nevertheless programmatically possible (e.g., by submitting an API call or other communication configured to cause an automated process of the service provider to use the durable-until key to obtain the shreddable key from a backup object) because the durable-until key is still available for restoration and the backup key is unnecessary for restoration when the durable-until key is available. As with FIG. 4, once both the durable-until key and the backup key are deleted/destroyed, restoration becomes impossible (absent the availability of other backup mechanisms).

Other timelines are also considered as being within the scope of the present disclosure. For example, a customer may make an API call whose fulfillment puts the shreddable key back to an earlier state (e.g., a programmatically restorable state). For instance, after the durable-until key is destroyed, the customer may submit an API call to have the shreddable key backed up to a different durable-until key, which may be generated to fulfill the request. Similarly, an API call may be made to back up a durable-until key to a new backup key to render the shreddable key more durably stored for an amount of time. In some embodiments, durable-until keys are periodically backed-up to a new backup key for an amount of time which may be definite or indefinite (e.g., until a customer submits an API call to stop the re-backing up process). To re-back up a durable-until key, the service provider may encrypt the durable-until key to a new backup key before deleting a previous backup to ensure the possibility of restoring the shreddable key at all times. In some embodiments, some states of a shreddable key are irreversible. For example, in some embodiments once API calls that reduce the durability of a shreddable key are fulfilled, the service provider system is configured to deny requests to reverse any effects of the fulfillment. In some embodiments, a window of reversibility is provided to enable restoration of previous states in case of accidental transitions. In this manner, due to irreversibility, a customer can be sure that an unauthorized entity cannot increase the durability of a shreddable key to facilitate a data security breach.

Figure 6:
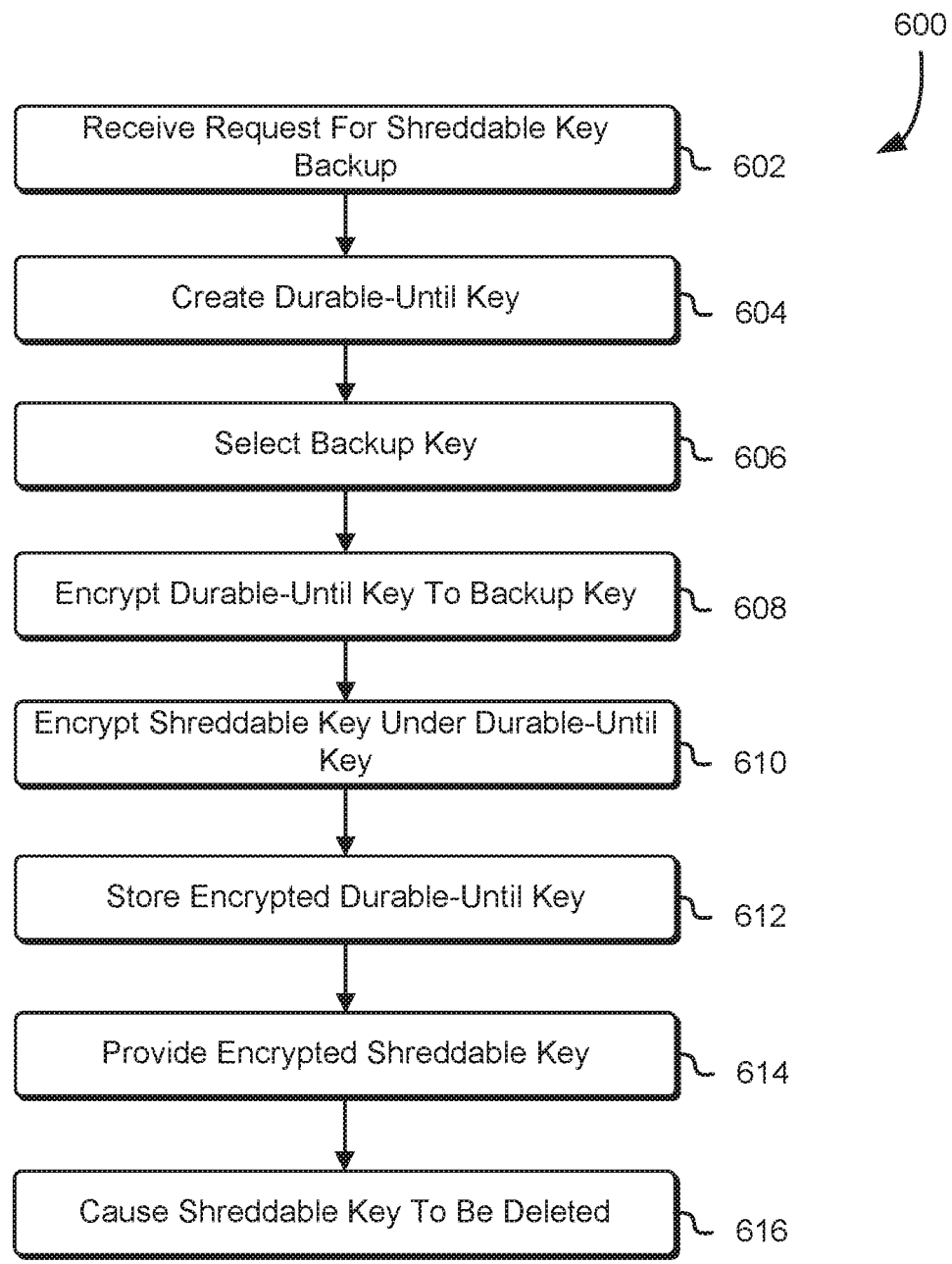
FIG. 6 shows an illustrative example of a process for backing up a cryptographic key in accordance with an embodiment.

FIG. 6 shows an illustrative example of a process 600 for providing a backup of a shreddable key in accordance with an embodiment. The process 600 may be performed by any suitable system, such as a cryptography service as described below. In an embodiment, the process 600 includes receiving 602 a request for a shreddable key backup. The request may be, for example, a web service application programming interface request received by a web server of the cryptography service. The request may be received from a customer of a computing resource service provider that operates the cryptography service or another entity, such as from another service of the computing resource service provider on behalf of the customer. The request may vary in accordance with various embodiments. For example, a primary objective of fulfillment of the request may be to provide a backup of a key provided by or otherwise specified (e.g., by an identifier in a parameter of the request) by the customer. In some embodiments, the backup is a secondary objective of fulfillment of the request. For example, the backup may be generated automatically as part of performing another operation, such as creating/importing the shreddable key or creation of an account. Further, while not illustrated in FIG. 6, in some embodiments, the process 600 includes generating the shreddable key, such as when the shreddable key is inaccessible in plaintext form to the customer and other entities after creation.

As illustrated in FIG. 6, the process 600 includes creating 604 (or otherwise obtaining, such as by receiving) a durable-until key. In addition, a backup key may be selected 606. The backup key may be selected, for example, by a web server or an application server of the cryptography service or, in some embodiments, by a security module. In an embodiment, the selected backup key is a private cryptographic key of a public/private key pair and selecting the backup key may be performed by selecting the public key of the public/private key pair. It should be noted that, while use of an asymmetric key pair for the backup key provides numerous technical advantages, such as the ability to encrypt without access to the key usable to decrypt (which may be physically secured), the techniques described herein extend to embodiments where the backup key is a symmetric cryptographic key. In an embodiment, a service provider maintains a database (generally, data store) identifying available backup keys in association with corresponding destruction dates. Selecting 606 the backup key may include querying the database to determine a backup key with a suitable destruction date. In some embodiments, the backup key is selected to be the backup key that will remain undestroyed for an amount of time closest to an amount of time the shreddable key is to be durably stored (durability duration, also referred to as a backup duration). There may be a durability duration associated with the request (e.g., specified in a parameter of the request or a default duration) and the backup key may be selected as a backup key with a remaining lifetime closest to the durability duration. In some embodiments, the backup key is selected as having a remaining lifetime that is closest to but exceeds the durability duration so that the customer is guaranteed the ability to restore the shreddable key for at least an amount of time. In some embodiments, a customer can specify (e.g., in API request parameters) how the backup key should be selected (e.g., whether the selected backup key should have a lifetime that exceeds the durability duration). In some examples, a customer may specify in a request parameter a regulatory compliance regime (e.g., the Health Insurance Portability and Accountability Act (HIPAA) compliance regime) with a corresponding requirement for an amount of time data should be retained. The backup key may be selected to provide a durability lifetime in compliance with the specified regime(s).

With the backup key selected 606, the process 600 may include encrypting 608 the durable-until key using the selected backup key (e.g., by using a selected public key of a public/private key pair). Similarly, the process 600 may include encrypting 610 the shreddable key under the durable-until key (e.g., by using the durable-until key to encrypt the shreddable key or by using a public key of a public/private key pair). Encryption of the durable-until key and encryption of the shreddable key may be performed by any system with access to the durable-until key, which, in some embodiments, is limited to security modules of the cryptography service.

The encrypted durable-until key may be durably stored 612, such as described above. For example, the durable-until key may be written to a computer-readable storage medium (or redundantly to plurality of computer-readable storage media). In some examples, an API call is made to a data storage service to store the durable-until key as a data object or in a data object to be persistently stored in the data storage service. Generally, any way by which the encrypted durable-until key may be durably stored may be used. The encrypted shreddable key may be provided 614 (e.g., in the form of a backup object, such as described above). Providing the shreddable key may be performed in various ways, depending on how a system is configured to operate. For example, in some embodiments, the backup object is provided in a response to the request to back up the sheddable key. In other examples, in addition or in alternative, the backup object is transmitted to a data storage service for storage, e.g., on behalf of the customer. Generally, any way the shreddable key may be persisted for possible later use in restoration of the shreddable key may be used.

In various embodiments, the service provider does not retain a copy of the shreddable key. Accordingly, the process 600 may include causing 616 the plaintext copy of the shreddable key to be deleted. The shreddable key may be deleted 616 by, for example, allowing the shreddable key to be written over in computer memory, by overwriting one or more memory locations in which the shreddable key is stored, or otherwise.

Figure 7:
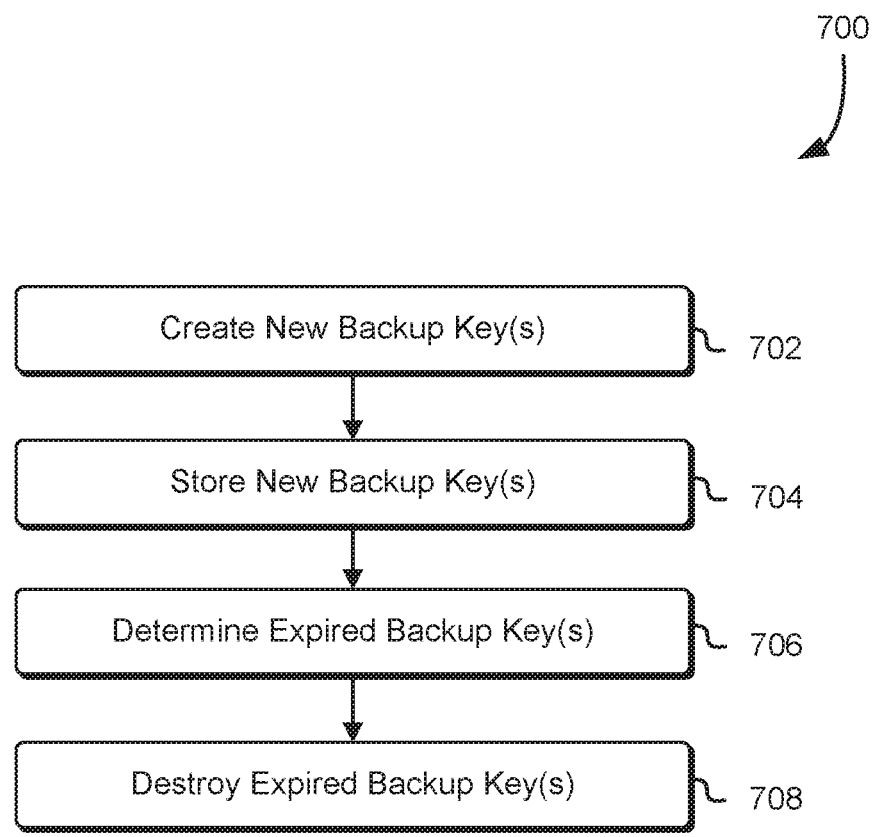
FIG. 7 shows an illustrative example of a process for managing backup keys in accordance with at least one embodiment.

As noted, backup keys may be destroyed on a schedule to ensure that restorable shreddable keys become unrestorable at some point in time. Similarly, as backup keys are destroyed, additional backup keys are introduced to replenish the backup keys that were destroyed. FIG. 7 shows an illustrative example of a process 700 for managing backup keys in accordance with an embodiment. As illustrated in FIG. 7, the process 700 includes creating a set of new backup keys, which may be performed by creating a set of public/private key pairs. The new backup keys may be stored. In some embodiments, storing the backup keys may include storing the private keys in a physically secure location, such as in a safe in a locked room in a private facility inaccessible to the public. The keys may be stored in any suitable manner, such as on a computer-readable or other storage medium. Because backup keys will be seldom, if ever used, in some embodiments, the backup keys are stored by printing the backup keys on paper or another storage medium. Generally, the private keys may be stored in any way that allows for the later retrieval of the private keys. Public keys may be stored in a database or other data store so as to be usable to encrypt durable-until keys and possibly other data. The public keys may be stored in association with destruction dates of corresponding private keys so that, when a backup key is being selected, a suitable public key may be determined.

Once backup keys have been stored, the process 700 may include determining 706 a set of backup keys that have expired. The set of backup keys that have expired may be performed, for example, by querying a database or otherwise, such as by opening a safe and reading labels on storage media that indicate expiration dates. Once the set of expired backup keys has been determined, the process 700 may include destroying 708 the expired backup keys. As noted, expired backup keys may be destroyed in various ways in accordance with various embodiments, such as by overwriting memory locations, physically destroying storage media on which the expired keys are store, or otherwise.

The process 700 may be performed multiple times over time to periodically destroy and replenish backup keys, thereby providing the ability to completely render irrecoverable shreddable keys while, at the same time, allowing for the temporarily durable backup of additional shreddable keys.

Figure 8:
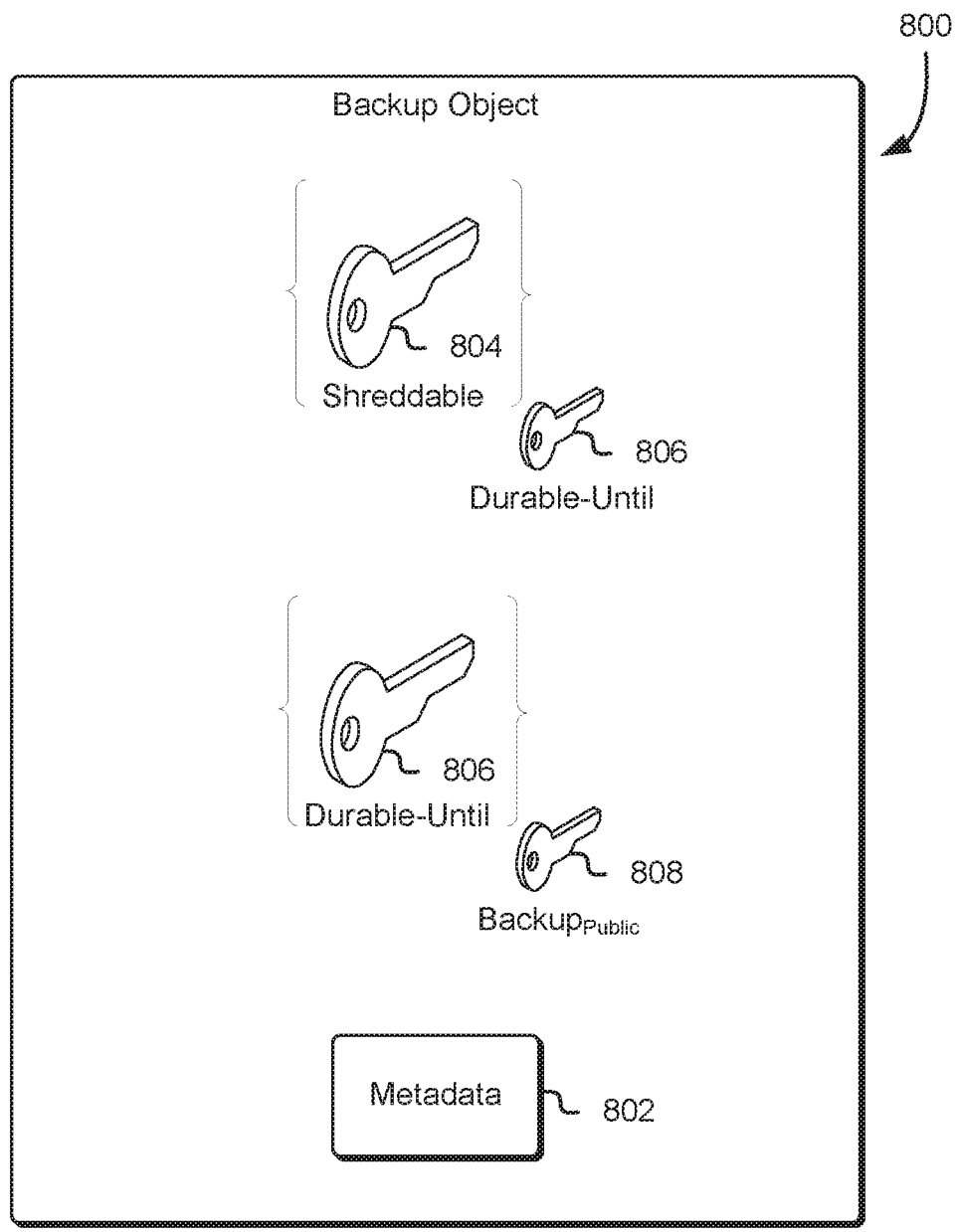
FIG. 8 shows an illustrative example of a backup object in accordance with an embodiment.

As discussed above, variations of the explicitly disclosed embodiments are considered as being within the scope of the present disclosure. For example, backup objects may take various forms in accordance with various embodiments. FIG. 8 shows an alternate version of a backup object 800 to that disclosed above. In an embodiment, the backup object 800 includes various fields, such as described above in connection with FIG. 3. For example, the backup object 800 includes a shreddable key field, a customer identifier field, an expiration field, a policy field, and other metadata fields 802. Some or all metadata fields may also be persisted in the backup object 800 in plaintext or otherwise in a manner accessible to the customer to enable the customer to utilize the data (e.g., by determining the expiration). As illustrated in FIG. 8, as with the backup object described above in connection with FIG. 3, the backup object 800 includes a shreddable key 804 encrypted under a durable-until key 806. However, in the embodiment illustrated in FIG. 8, the backup object 800 includes a durable-until key encrypted by a public backup key corresponding to a private backup key. Thus, the backup object 800 includes a copy of the durable-until key that is encrypted but decryptable using the private backup key.

In some embodiments, storage of the encrypted durable-until key in the backup object 800 is redundant to a copy of the encrypted durable-until key stored by the service provider. In other embodiments, the service provider does not retain a copy of the encrypted durable-until key but relies on the customer to manage the encrypted durable-until key for potential backup purposes. As evident from the additional information stored in the backup object 800 (relative to the backup object 300 described above in connection to FIG. 3), access to either the durable-until key or the private backup key enables restoration of the shreddable key 804.

Numerous variations of the embodiments described above are considered as being within the scope of the present disclosure. For example, the above embodiments show backup of data using two layers of encryption (data encrypted under a durable-until key and the durable-until key encrypted under a backup key). Additional layers may also be used. For example, a private backup key may be encrypted under another backup key and then durably stored. Each layer of encryption may correspond to a different level of durability. Also, as noted, data different from or in addition to a shreddable key may be backed up using the techniques described herein. Other variations are also considered as being within the scope of the present disclosure.

Figure 9:
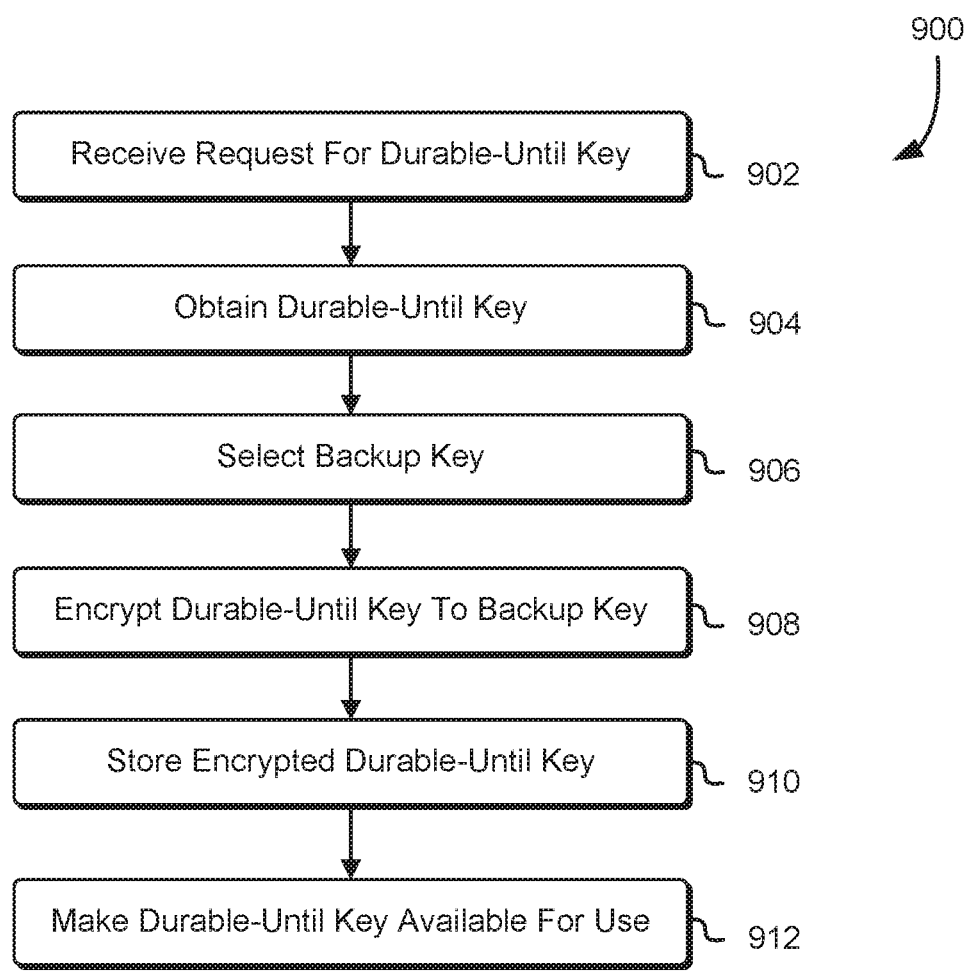
FIG. 9 shows an illustrative example of a process for making available a durable-until key in accordance with an embodiment.

The various techniques described herein are applicable to a wide variety of contexts. For example, in some embodiments, durable-until keys may be used in a wide variety of circumstances and for a wide variety of purposes, not just for backing up other data (such as other cryptographic keys). FIG. 9 shows an illustrative example of a process 900 for providing durable-until keys, such as in operation of a service, such as a cryptography service, described below or in any service that provides cryptographic keys as part of its operations. The process may be performed by any suitable system, such as a cryptography service, such as described below, with appropriate components of the system performing various operations of the process 900. In some examples, a security module performs some or all of the process 900.

Turning to the specifics of the illustrative embodiment of FIG. 9, a system performing the process 900 may receive 902 a request for a durable-until key (i.e., a request for a durable cryptographic key). The request may be, for example, a web service or other application programming interface request received over a network although, in some embodiments, a request may be an inter-process request. The request may be a request with a primary objective specifically to obtain a durable-until key or to otherwise have a durable-until key made available for use or the request may have a primary objective that different from obtaining a durable-until key but whose fulfillment includes a durable-until key being made available for use. As an illustrative example, the request may be a request to perform a backup operation and fulfillment of the request, among other operations, may include providing a durable-until key to be used as part of performing the backup operation.

To fulfill the request that is received 902, the process 900 may include obtaining 904 a durable-until key. The durable-until key may be obtained 904 in various ways, such as by generating a durable-until key or retrieving a durable-until key from data storage, such as from a list of unused cryptographic keys that have been pre-generated. A backup key may also be selected 906, such as described above. For example, the backup key may be a selected 906 by determining a durability duration for the durable-until key (e.g., by a default or a parameter in the request that was received 902) and selecting, from a set of backup keys, the backup key as a key whose remaining lifetime exceeds and/or is closest to the durability duration. The selected backup key may be, as noted above, a private key of a public-private key pair. In such embodiments, the backup key may be selected by selecting the corresponding public key. Generally, selection of a public or private cryptographic key may be performed by selection of the key itself or selection of the other of the public or private key. In other words, selection of a public key may be performed by selecting a corresponding private key and selection of a private key may be performed by selecting the corresponding public key. As above, the backup key may be stored in an offline repository or otherwise may be made inaccessible.

Once the selected backup key has been obtained, the process 900 may include encrypting 906 the durable-until key to the selected backup key. For example, in embodiments where the selected backup key is a private key, the durable-until key may be encrypted using the corresponding public key. In embodiments where the backup key is a symmetric cryptographic key, the backup key may be used to encrypt the durable-until key. Generally, any manner by which the durable-until key is decryptable using the selected backup key may be used. Further, other information may also be included in a backup object that includes the durable-until key, such as information included in backup objects described above.

Once the encrypted durable-until key has been encrypted 908, the encrypted durable-key may be stored 910. The encrypted durable-until key may be stored 910 in various ways in accordance with various embodiments. For example, the encrypted durable-until key may be stored in local storage, sent to a remote storage device, sent to a data storage service, or otherwise may be caused to be persisted in one or more data storage media. In some embodiments a record of a database or other record may be updated to indicate that the encrypted durable-until key is available for backup and to store information relevant to using the encrypted durable-until key to restore the durable-until key, such as an identifier associated with the backup key to enable selection of the backup key for decryption of the backup object that contains the durable-until key.

In addition to the above operations, the process 900 may include making 912 the durable-until key available for use. The durable-until key may be made available for use in various ways in accordance with different embodiments. For example, the durable-until key may be transmitted to a requesting computer system (requestor) that submitted the request. The key may be transmitted, for example, over a secure (e.g., encrypted) channel. In other examples, the durable-until key may be made available to a set of security modules, such as described below. In some examples, each security module of the set is provided a copy of the durable-until key to enable the security module to store the durable-until key in local data storage and use the durable-until key for performing cryptographic operations. In yet other examples, a security module may be provided the durable-until key and the security module, in response to an API call, may encrypt the durable-until key to a cryptographic key only accessible to a set of security modules and store the durable-until key in a network-accessible data storage location to enable each of the set of security modules to obtain the encrypted durable-until key, decrypt the encrypted durable-until key, and use the durable-until key for the performance of cryptographic operations. Making the durable-until key may also include associating the durable-until key with an identifier that is specifiable as a parameter in an API call to cause a security module to perform a cryptographic operation specified by the API call.

Figure 10:
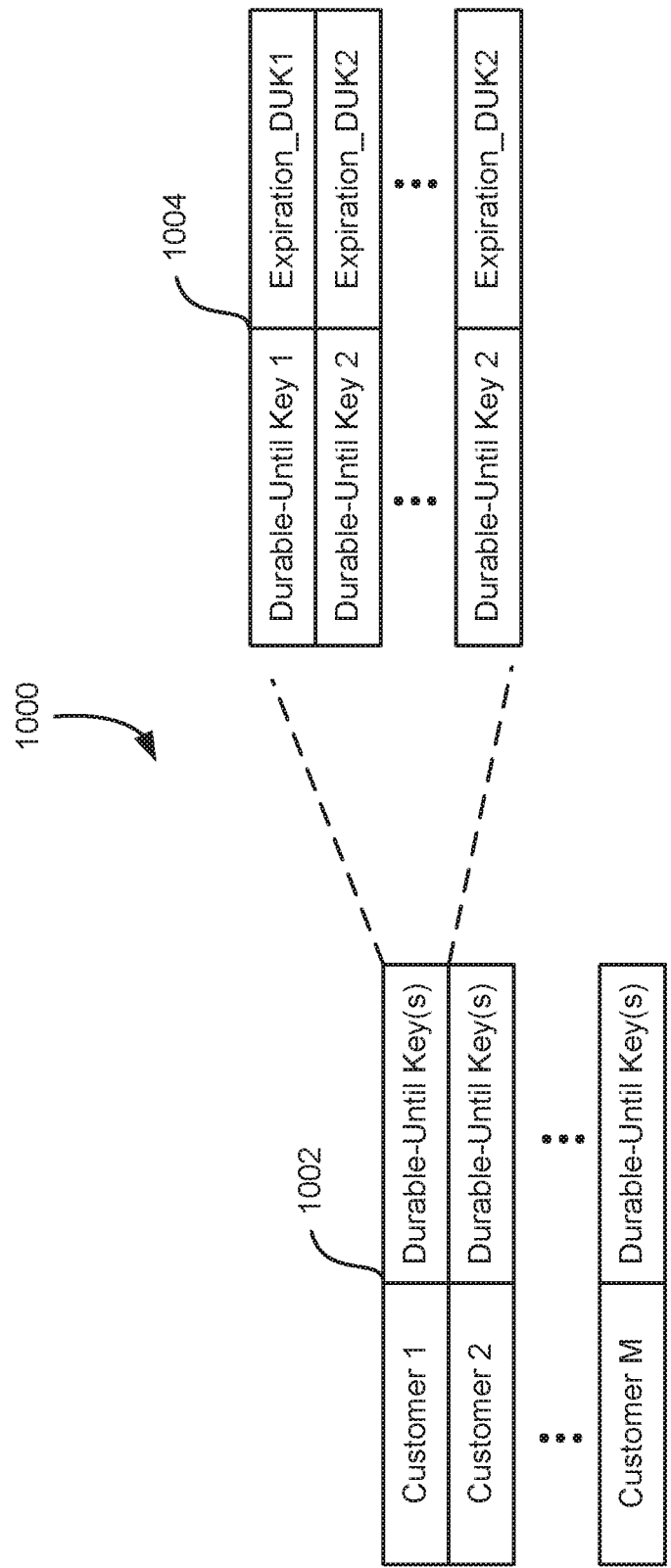
FIG. 10 shows an illustrative example of a database for managing customer keys in accordance with an embodiment.

As noted, when a durable-until key is made available, a database may be updated. IN some contexts, a service provider has multiple customers and a database may be utilized to store information about durable-until keys for the various customers. FIG. 10 shows an illustrative example of such a database 1000. In an embodiment, the database includes a table 1002 with rows whose entries associate customers (and/or other entities, such as accounts, users and the like) with their corresponding durable-until keys. For example, referring to the first row in the table 1002, a customer (identified in the illustration as "Customer 1" is associated with a set of durable-until keys that are managed by the service provider (e.g., using a cryptography service, such as described below) for the customer. The association of customer keys may be made in various ways in accordance with various embodiments. For example, an entry in the table 1002 may itself include a sub-table 1004 that associates durable until keys with corresponding expirations. For instance, an identifier illustrated as "Durable-Until Key 1" is associated with an expiration represented by "Expiration_DUK1." The association may be made, for instance, by pairing durable-until key identifiers with corresponding expiration times. In this manner, the customer or service provider may (e.g., through an API call) query the database 1000 to obtain information about the set of durable-until keys of the customer. For example, the customer may query the database 1000 to determine the expiration of a specified durable-until key or, for instance, to determine a set of durable-until keys expiring in a specified range of time.

The expiration time specified in the sub-table 1004 may be at time at which a backup key to which a corresponding durable-until key is scheduled to be destroyed, thereby rendering the durable-until key less durably stored (e.g., because a backup object storing the durable-until key becomes un-decryptable). In other words, in some embodiments, after the expiration, loss of the durable key is permanent absent extraordinary computational effort. It should be noted that the database 1000 illustrated in FIG. 10 is just one example of a manner by which data about durable-until keys may be stored. Other schemas that store data differently and that include additional types of information are also considered as being within the scope of the present disclosure. For example, there may be a separate row for each customer/durable-until key pair and/or data structures other than tables may be used. Further, instead of a sub-table, information may be otherwise organized, such as by using commas or other delimiters in a list.

Figure 11:
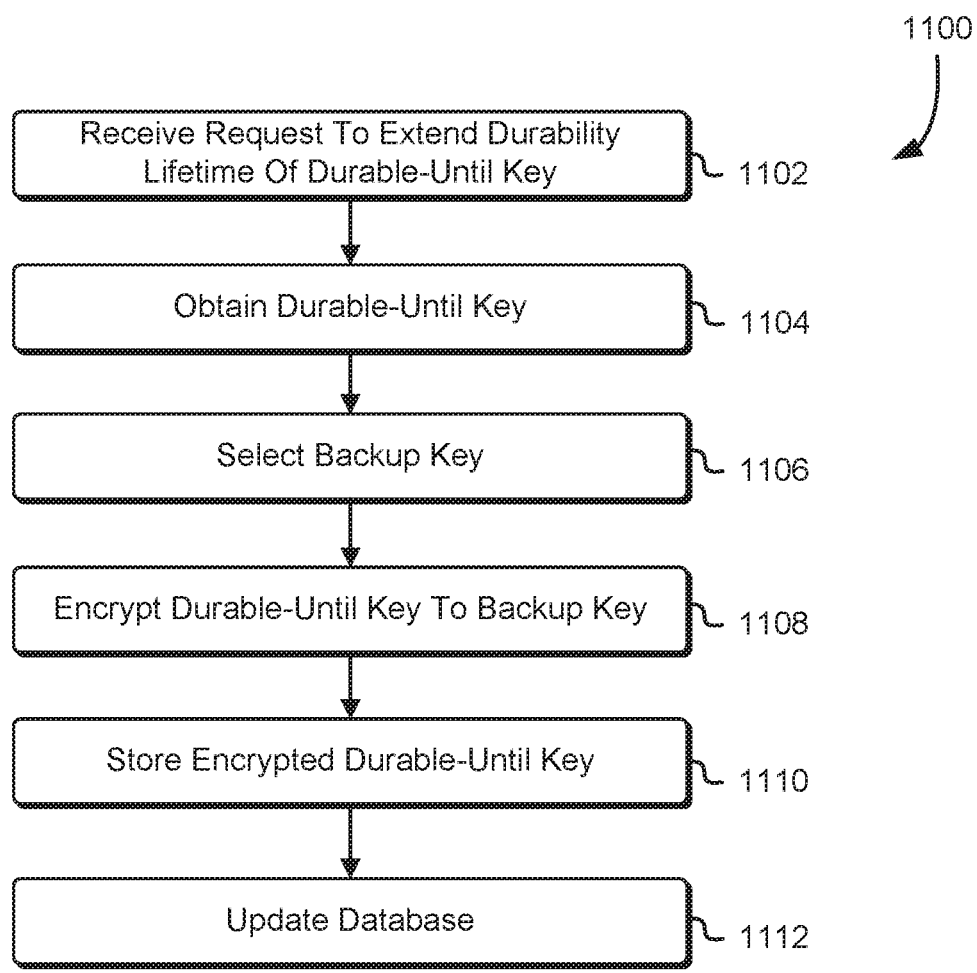
FIG. 11 shows an illustrative example of a process for extending a durability lifetime of a durable-until key in accordance with an embodiment.

In various embodiments, the lifetime of durability of a durable-until key is extendible. FIG. 11, accordingly, shows an illustrative example of a process 1100 for extending the lifetime of durability of a durable-until key. The process 1100 may be performed by any suitable system, such as by a frontend or other server of a cryptography service, such as described below. In an embodiment, the process 1100 includes receiving 1102 a request to extend the durability lifetime of a durable-until key. The request may be, for instance, an application programming interface request, such as a web service request, that specifies the durable-until key by an identifier in a parameter of the request or by including the durable-until key as a parameter of the request (in such embodiments where the requestor has access to the durable-until key). To fulfill the request that was received 1102, the process 1100 may include obtaining 1104 the durable-until key specified in the request. The durable-until key may be obtained in various ways in accordance with various embodiments and the way by which the durable-until key is obtained 1104 may vary in accordance with the manner by which the durable-until key was stored. For example, the request may include a copy of the durable-until key. As another example, an encrypted copy of the durable-until key may be obtained from data storage, transmitted to a security module to be decrypted and reencrypted.

A backup key may be selected 1106 and the durable-until key may be encrypted 1108, such as described above. Further, the encrypted durable-until key may be stored 1110 or otherwise caused to be stored, such as described above. A database, such as the database described above in connection with FIG. 10 may be updated to reflect the new durability lifetime (e.g., by writing a new expiration to the database for the durable-until key).

Numerous variations to the processes described herein are considered as being within the scope of the present disclosure. For example, processes involving establishing a durability lifetime for a durable-until key may include additional operations. For instance, in some embodiments, a request to extend the durability lifetime is fulfillable subject to being allowed by policy associated with the cryptographic key whose durability is being extended. In some embodiments, a policy enforcement service stores policies applicable to durable-until and/or shreddable keys and other resources and provides, to a cryptography or other service, information that the service uses to determine whether fulfilling requests is in accordance with policies. In other embodiments, backup objects contain policies on durable-until and/or shreddable keys. For example, a request for a durable-until key may include one or more restrictions on the durable-until key that cause such restrictions to be encoded in a backup object when the request is fulfilled. The restrictions may, for example, indicate a number of times the durability lifetime can be extended (which may be zero) and/or a maximum amount of time the durability lifetime may be extended at each extension. When a request to extend the durability lifetime of a cryptographic key is received, a backup object may be obtained (e.g., as a required parameter in the request or from data storage), decrypted, and policy may be analyzed to determine whether and/or how to fulfill the request. The request may be fulfilled or denied accordingly. The policy may also be stored and accessed in other ways in accordance with various embodiments.

Other variations are also considered as being within the scope of the present disclosure. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include, but not limited to algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Figure 12:
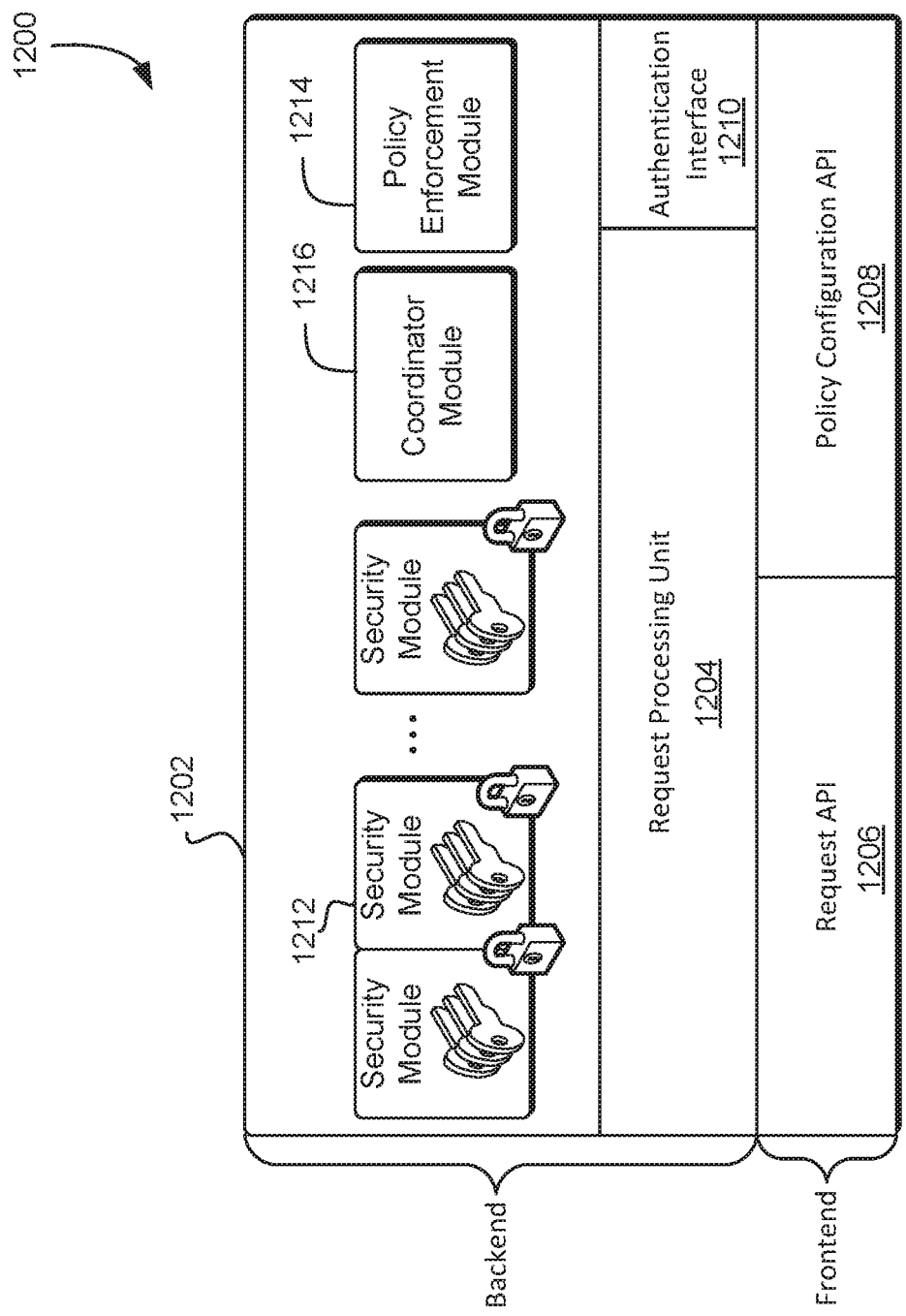
FIG. 12 shows an illustrative example of a cryptography service in accordance with an embodiment.

As discussed above, various embodiments of the present disclosure are directed to providing cryptography services. Cryptography services may be provided by a cryptography service system such as described above. FIG. 12 accordingly shows an illustrative example of a cryptography service 1200 in accordance with various embodiments. As illustrated in FIG. 12 and as discussed above, the cryptography service 1200 is logically comprised of a frontend system and a backend system. Both the frontend system and the backend system may be implemented by one or more computer systems configured to perform operations described herein. For example, as illustrated in FIG. 12, the frontend system of the cryptography service 1200 implements a request API and a policy configuration API. The request API, in an embodiment, is an API configured for requesting cryptographic and other operations to be performed by the cryptography service. Thus, requests may be made to the frontend system via the request API in order for such cryptographic operations to be performed by the cryptography service.

The request API may be configured with the following example, high-level, requests available:

CreateKey(KeyID)
Encrypt(KeyID, Data, [AAD])
Decrypt(KeyID, Ciphertext, [AAD])
Shred(KeyID)
ReKey(Ciphertext, OldKeyID, NewKeyID).

A CreateKey(KeyID) request, in an embodiment, causes the cryptography service to create a key identified by the KeyID identified in the request. Upon receipt of a request, the cryptography service may generate a key and associate the key with the KeyID. It should be known that KeyID's may be, but are not necessarily unique identifiers. For instance, a KeyID may identify a family of keys. For example, in some embodiments, key rotation is performed. Key rotation may involve replacing keys with other keys to prevent collection of enough decrypted data to allow practical cracking of a cipher used. If performed at the direction of an entity different from the cryptography service, use of the CreateKey(KeyID) request may cause the cryptography service to create a new key to replace an old key identified by the KeyID. The old key may remain identified by the KeyID, but may, for instance, be only used for decryption (of data that has already been encrypted using the old key) and not for future encryption. As another example, in some embodiments, users of the cryptography service provide their own key identifiers and there is a possibility that two different customers may provide the same identifier. In such instances, the identifier may not uniquely identify a key or even uniquely identify a family of keys. Various measures may be in place to address this. For example, an identity or other information associated with a user of the cryptography service may be used to identify the proper key or family of keys. In still other embodiments the cryptographic service may assign a KeyID randomly, sequentially, or using any other method.

It should be noted that, when a KeyID does not uniquely identify a key, various systems may be in place to enable proper functionality. For example, in various embodiments, a family of keys identified by a KeyID is finite. If a decryption operation using a key identified by a KeyID is requested, additional data (e.g., a time stamp of when the encryption was performed) may enable determining the proper key to use. In some embodiments, ciphertexts may include information indicating a key version. In some embodiments, all possible keys are used to provide different decryptions of the data. Since there are a finite number of keys, the proper decryption may be selected from those provided. In some embodiments, decryption with a key is performed in a manner that enables the cryptographic service to detect that the ciphertext was not generated based at least in part on the key, such as by using authenticated encryption. Other variations are also considered as being within the scope of the present disclosure.

An Encrypt(KeyID, Data, [AAD]) request may be used to cause the cryptography service to encrypt the specified data using a key identified by the KeyID. Additional Authenticated Data (AAD) may be used for various purposes and may be data that is not necessarily encrypted, but that is authenticated, e.g., by an electronic signature, a message authentication code or, generally, a keyed hash value included with the AAD. In some embodiments, the ciphertext is generated including at least a portion of the AAD. In some other embodiments the AAD is provided separately during decryption. In some other embodiments, the AAD is generated at decryption time based at least in part on the request and or other metadata such that decryption will only succeed when the metadata passes. In some embodiments, policy may constrain whether a cryptographic operation can be performed with respect to particular AAD. Processing of Encrypt(KeyID, Data, [AAD]) requests may require, by programming logic and/or policy enforced by the cryptography service, both that the AAD contain particular values and that the AAD be authentic (e.g., not modified since original transmission). Similarly, a Decrypt(KeyID, Ciphertext, [AAD]) request may be used to cause the cryptography service to decrypt the specified ciphertext using a key identified by the KeyID. The AAD in the Decrypt(KeyID, Ciphertext, [AAD]) request may be used such as described above. For instance, processing of the Decrypt(KeyID, Ciphertext, [AAD]) may require, by programming logic and/or policy enforced by the cryptography service, both that the AAD contain particular values and that the AAD be authentic (e.g., not modified since original transmission).

The Shred(KeyID), in an embodiment, may be used to cause the cryptography service to electronically shred a key or family of keys identified by the specified KeyID. Electronic shredding may include making the key no longer accessible. For example, use of the Shred(KeyID) request may cause the cryptography system to command one or more hardware devices to perform a SecureErase operation on one or more keys identified by the specified KeyID. Generally, the key(s) identified by the KeyID may be electronically shredded in any suitable manner, such as by overwriting data encoding the key with other data (e.g., a series of zeroes or ones or a random string). If the key(s) are stored encrypted under a key, the key used to encrypt the keys may be electronically shredded, thereby causing a loss of access to the key(s). In some embodiments, the shred operation may cause decrypt operations indicating the shredded KeyID to fail at some determined point in the future. Other manners of securely and permanently destroying any possible access to the key(s) may be used.

The ReKey(Ciphertext, OldKeyID, NewKeyID) request, in an embodiment, may be used to cause the cryptography service to encrypt ciphertext under a different key. When the cryptography service receives a ReKey(Ciphertext, OldKeyID, NewKeyID) request, it may use a key identified by the OldKeyID to decrypt the specified ciphertext and then use a key identified by the NewKeyID to encrypt the decrypted ciphertext. If a key identified by the NewKeyID does not yet exist, the cryptography service may generate a key to use and associate the generated key with the specified NewKeyID, such as described in connection the Create (KeyID) request described above. In some embodiments, the ReKey operation may be operable to cause data to be transferrable between isolated instances of a cryptography service. In some embodiments, a policy might permit a rekey operation to be performed on a ciphertext but might not permit the same requestor to directly decrypt the ciphertext. In some embodiments, ReKey might support rekeying a ciphertext from a key identified by a first KeyID within a first account to a key identified by a KeyID within a second account.

Similarly, the frontend system may implement a policy configuration API which, in an embodiment, enables users to submit requests for configuring policies for the performance of cryptographic operations and for other policy-related operations. Policies may be associated with keys, groups of keys, accounts, users and other logical entities in various embodiments. Example policies, which may be configured via the policy configuration API, are provided below. In an embodiment, the cryptography service policy configuration API includes the following requests:

SetKeyPolicy(KeyID, Policy)
Suspend(KeyID, Public Key)
Reinstate(KeyID, Private Key).

In an embodiment, the SetKeyPolicy(KeyID, Policy) request may be used to cause the cryptography service to store a policy on the key (or family of keys) identified by the KeyID. A policy may be information that is determinative of whether a requested cryptographic operation can be performed in a particular context. The policy may be encoded in a declarative access control policy language, such as eXtensible Access Control Markup Language (XACML), Enterprise Privacy Authorization Language (EPAL), Amazon Web Services Access Policy Language, Microsoft SecPol or any suitable way of encoding one or more conditions that must be satisfied for a cryptographic operation to be performed. Policies may define what operations can be performed, when the operations can be performed, which entities can make authorized requests for operations to be performed, which information is required for a particular request to be authorized, and the like. In addition, policies may be defined and/or enforced using access control lists, privileges associated with users, and/or operation bitmasks in addition to or instead of the examples given above. Example policies appear below.

In some embodiments the cryptographic service may support a suspend operation, e.g., using a Suspend(KeyID, Public Key) API call. A suspend operation enables the customer of the cryptographic service to deny the operator of the cryptographic service use of or access to a key. This can be useful to customers concerned about covert lawful orders or other circumstances in which the operator of the cryptographic service might be compelled to perform some operation using a key. It may also be useful to customers that wish to lock particular data and render it inaccessible online. In some embodiments, a suspend operation might include receiving a public key from a customer and encrypting the key specified by a given KeyID with the received public key and shredding the key specified by the KeyID, such that the provider is not able to access the suspended key unless the private key associated with the public key is provided, e.g., using a Reinstate(KeyID, Private Key) API call that both specifies the KeyID and includes the private key. In some other embodiments, a suspend operation might involve encrypting a key associated with a specified KeyID using another key managed by the cryptographic service, including without limitation one created for the purpose of the instant suspend operation. The ciphertext produced by this operation can be provided to the customer and not retained within the cryptographic service. The original key identified by the KeyID can then be shredded. The cryptographic service may be operable to receive the provided ciphertext and re-import the suspended key. In some embodiments the ciphertext may be generated in a manner that will prevent the cryptographic service from returning a decrypted version to the customer.

As illustrated in FIG. 12, the cryptography service 1200 includes a backend system 1202 that itself comprises various components in some embodiments. For example, the backend system in this example includes a request processing system (unit) 1204 which may be a subsystem of the cryptography service 1200 that is configured to perform operations in accordance with requests received through either the request API 1206 or the policy configuration API 1208. For example, the request processing component may receive requests received via the request API and the policy configuration API determines whether such requests are authentic and are therefore fulfillable and may fulfill the requests. Fulfilling the request may include, for example, performing and/or having performed cryptographic operations. The request processing unit may be configured to interact with an authentication interface 1210 which enables the request processing unit to determine whether requests are authentic. The authentication interface may be configured to interact with an authentication service such as described above. For example, when a request is received by the request processing unit, the request processing unit may utilize the authentication interface to interact with an authentication service which may, if applicable, provide authentication proof that may be used in order to cause a performance of cryptographic operations.

The backend system of the cryptography service 1200 also, in this illustrative example, includes a plurality of a security modules 1212 (cryptography modules), a policy enforcement module 1214, and a coordinator module 1216. One or more of the security modules may be hardware security modules although, in various embodiments, a security module may be any suitable computer device configured according to have capabilities described herein. Each security module in an embodiment stores a plurality of keys associated with KeyIDs. Each security module may be configured to securely store the keys so as to not be accessible by other components of the cryptography service 1200 and/or other components of other systems. In an embodiment, some or all of the security modules are compliant with at least one security standard. For example, in some embodiments, the security modules are each validated as compliant with a Federal Information Processing Standard (FIPS) outlined in FIPS Publication 140-1 and/or 140-2, such as one or more security levels outlined in FIPS Publication 140-2. In addition, in some embodiments, each security module is certified under the Cryptographic Module Validation Program (CMVP). A security module may be implemented as a hardware security module (HSM) or another security module having some or all capabilities of an HSM. In some embodiments, a validated module is used to bootstrap operations. In some embodiments, customers can configure some keys that are stored in and operated on only by validated modules and other keys that are operated on by software. In some embodiments, the performance or cost associated with these various options may differ.

The security modules may be configured to perform cryptographic operations in accordance with instructions provided by the request processing unit. For example, the request processing unit may provide ciphertext and a KeyID to an appropriate security module with instructions to the security module to use a key associated with the KeyID to decrypt the ciphertext and provide in response the plaintext. In an embodiment, the backend system of the cryptography service 1200 securely stores a plurality of keys forming a key space. Each of the security modules may store all keys in the key space; however, variations are considered as being within the scope of the present disclosure. For example, each of the security modules may store a subspace of the key space. Subspaces of the key space stored by security modules may overlap so that the keys are redundantly stored throughout the security modules. In some embodiments, certain keys may be stored only in specified geographic regions. In some embodiments, certain keys may be accessible only to operators having a particular certification or clearance level. In some embodiments certain keys may be stored in and used only with a module operated by a particular third party provider under contract with the provider of data storage services. In some embodiments, constructive control of security modules may require that lawful orders seeking to compel use of keys other than as authorized by the customer to involve either additional entities being compelled or additional jurisdictions compelling action. In some embodiments, customers may be offered independent options for the jurisdiction in which their ciphertexts are stored and their keys are stored. In some embodiments, security modules storing keys may be configured to provide audit information to the owner of the keys, and the security modules may be configured such that the generation and providing of audit information not suppressible by the customer. In some embodiments, the security modules may be configured to independently validate a signature generated by the customer such that the provider (e.g., hosting the security modules) is not able to perform operations under keys stored by the security modules. In addition, some security models may store all of the key space and some security modules may store subspaces of the key space. Other variations are also considered as being the scope of the present disclosure. In instances where different security modules store different subspaces of the key space, the request processing unit may be configured such as with a relational table or other mechanism to determine which security module to instruct to perform cryptographic operations in accordance with various requests.

In an embodiment, the policy enforcement module is configured to obtain information from a request processing unit and determine, based at least in part on that information, whether the request received through the API may be performed. For example, when a request to perform cryptographic operation is received through the request API, the request processing unit may interact with the policy enforcement module to determine whether fulfillment of the request is authorized according to any applicable policy such as policy applicable to a specified KeyID in the request and/or other policies such as policy associated with the requestor. If the policy enforcement module allows fulfillment of the request, the request processing unit may, accordingly, instruct an appropriate security module to perform cryptographic operations in accordance with fulfilling the request.

As with all figures described herein, numerous variations are considered as being within the scope of the present disclosure. For example, FIG. 12 shows the policy enforcement module separate from security modules. However, each security module may include a policy enforcement module in addition to or instead of the policy enforcement module illustrated as separate. Thus, each security module may be independently configured to enforce policy. In addition, as another example, each security module may include a policy enforcement module which enforces policies different from policies enforced by a separate policy enforcement module. Numerous other variations are considered as being within the scope of the present disclosure.

Figure 13:
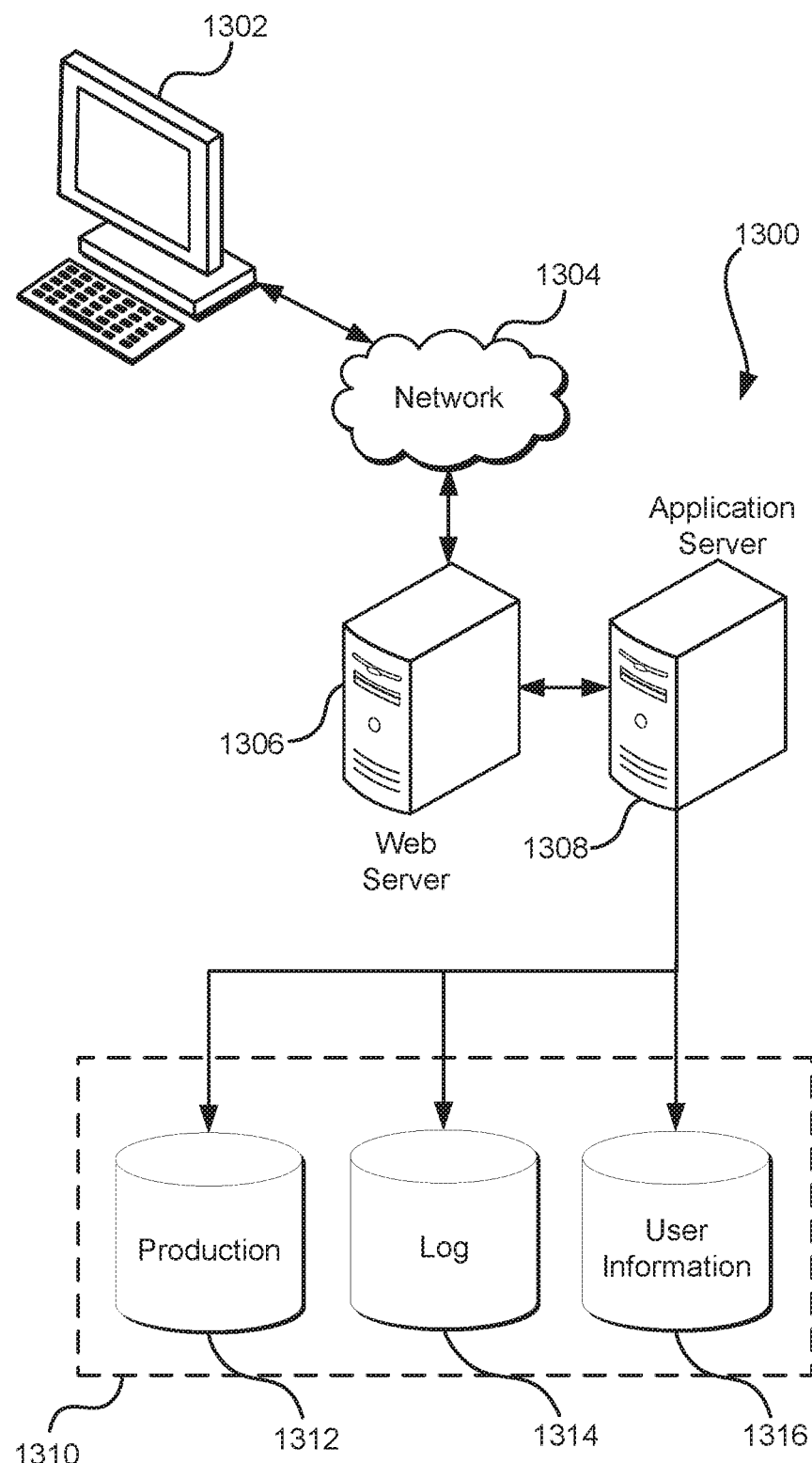
FIG. 13 illustrates an environment in which various embodiments can be implemented.

FIG. 13 illustrates aspects of an example environment 1300 for implementing aspects in accordance with various embodiments. As will be appreciated, although a web-based environment is used for purposes of explanation, different environments may be used, as appropriate, to implement various embodiments. The environment includes an electronic client device 1302, which can include any appropriate device operable to send and/or receive requests, messages or information over an appropriate network 1304 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1306 for receiving requests and serving content in response thereto, although for other networks an alternative device serving a similar purpose could be used as would be apparent to one of ordinary skill in the art.

The illustrative environment includes at least one application server 1308 and a data store 1313. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1302 and the application server 1308, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1313 can include several separate data tables, databases, data documents, dynamic data storage schemes and/or other data storage mechanisms and media for storing data relating to a particular aspect of the present disclosure. For example, the data store illustrated may include mechanisms for storing production data 1312 and user information 1316, which can be used to serve content for the production side. The data store also is shown to include a mechanism for storing log data 1314, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1313. The data store 1313 is operable, through logic associated therewith, to receive instructions from the application server 1308 and obtain, update or otherwise process data in response thereto. The application server 1308 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1302. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining an application programming interface (API) request, from a computing device, for a first cryptographic key;
   selecting, based at least in part on parameters of the request indicating a durability duration, a public cryptographic key from a plurality of public cryptographic keys, wherein each of the plurality of public cryptographic keys has a corresponding private cryptographic key in a set of private cryptographic keys;
   applying the selected public cryptographic key to generate an encrypted first cryptographic key, the encrypted first cryptographic key being decryptable using a corresponding private key from the set of private cryptographic keys, the private cryptographic key being scheduled to be destroyed at a time corresponding to the durability duration;

storing the encrypted first cryptographic key in a data store; and making the first cryptographic key available for use for an amount of time corresponding to the durability duration.

2. The computer-implemented method of claim 1, wherein information associated with the durability duration is encoded in the parameters of the request.

3. The computer-implemented method of claim 2, wherein information associated with the durability duration includes a length of time corresponding to the durability duration that is in compliance with a regulatory compliance regime.

4. The computer-implemented method of claim 1, further comprising:

obtaining, via an application programming interface, a second API request to extend the durability duration;

selecting, based at least in part on the second request to extend the durability duration, a second public cryptographic key from the plurality of public cryptographic keys;

using the second cryptographic key to generate an encrypted second key;

storing the encrypted second cryptographic key; and updating a database to indicate a new durability duration.

5. The computer-implemented method of claim 4, wherein the second request to extend the durability duration includes parameters identifying which second public cryptographic key of the plurality of public cryptographic keys to select.

6. The computer-implemented method of claim 4, wherein the second request to extend the durability duration includes a copy of the second public cryptographic key indicating which second public key of the plurality of public cryptographic keys to select.

7. The computer-implemented method of claim 4, wherein the second request to extend the durability duration is fulfillable by satisfying one or more polices associated with the first cryptographic key.

8. A system, comprising:

memory storing instructions which, as a result of being executed by one or more processors of the system, cause the system to at least:

obtain an application programming interface request for a first cryptographic key, wherein the request includes parameters indicating a durability duration for the first cryptographic key;

select, based at least in part on the parameters, a second cryptographic key from a set of cryptographic keys;

use the selected second cryptographic key to encrypt the first cryptographic key such that:

for a first amount of time corresponding to the durability duration, the first cryptographic key is recoverable from the encrypted first cryptographic key;

after the first amount of time has passed, the first cryptographic key is irrecoverable from the encrypted first cryptographic key; and the second cryptographic key is scheduled to be destroyed corresponding to the durability duration; and provide the first cryptographic key to be available, in response to the request, for use for an amount of time corresponding to the durability duration.

9. The system of claim 8, wherein durability duration information is encoded in the parameters of the request.

10. The system of claim 9, wherein the durability duration is a length of time that corresponds to a compliance regime is selected from a plurality of compliance regimes.

11. The system of claim 8, wherein the instructions, as a result of being executed by one or more processors of the system, further cause the system to at least:

obtain a request to extend the durability duration;

select, based at least in part on the request to extend the durability duration, a second public cryptographic key from the plurality of public cryptographic keys;

use the second cryptographic key to generate an encrypted second key;

store the encrypted second cryptographic key; and update a database to indicate a new durability duration.

12. The system of claim 11, wherein the request to extend the durability duration includes parameters specifying which second public cryptographic key of the plurality of public cryptographic keys to select.

13. The system of claim 11, wherein the request to extend the durability duration is fulfillable by satisfying one or more polices associated with the first cryptographic key.

14. A non-transitory computer-readable storage medium comprising executable instructions that, as a result of being executed by one or more processors of a computer system, cause the computer system to at least:

obtain an application programming interface (API) request, from a computing device, for a first cryptographic key;

determine a durability duration based at least in part on parameters included in the obtained API request for the first cryptographic key;

encrypt the first cryptographic key such that the first cryptographic key is decryptable using a second cryptographic key, wherein the parameters of the request indicate that the second cryptographic key has a limited lifetime before being destroyed in accordance with a durability duration; and cause the first cryptographic key to be available for use for a period of time that ends after the limited lifetime for the second cryptographic key has passed.

15. The non-transitory computer-readable storage medium of claim 14, wherein the parameter of the request indicates a default duration.

16. The non-transitory computer-readable storage medium of claim 14, wherein the parameter of the request is provided by a customer associated with a customer service provider network.

17. The non-transitory computer-readable storage medium of claim 14, wherein the executable instructions, further cause the computer system to at least:

obtain a second application programming interface (API) request to extend the durability duration;

select, based at least in part on the second API request, a second public cryptographic key from the plurality of public cryptographic keys;

use the second cryptographic key to generate an encrypted second key;

store the encrypted second cryptographic key; and update a database to indicate a new durability duration.

18. The non-transitory computer-readable storage medium of claim 17, wherein the encrypted second cryptographic key is redundantly stored as a data object in a data storage device.

19. The non-transitory computer-readable storage medium of claim 17, wherein the second API request to extend the durability duration includes a copy of the second public cryptographic key that specifies which second public key of the plurality of public cryptographic keys to select.

20. The non-transitory computer-readable storage medium of claim 17, wherein the second API request to extend the durability duration is fulfillable by satisfying one or more polices associated with the first cryptographic key.

\* \* \* \* \*